US010939103B2

(12) United States Patent
Gamei et al.

(10) Patent No.: US 10,939,103 B2
(45) Date of Patent: Mar. 2, 2021

(54) DATA ENCODING AND DECODING

(71) Applicant: SONY CORPORATION, Tokyo (JP)

(72) Inventors: James Alexander Gamei, Kingston Upon Thames (GB); Karl James Sharman, East Ilsley (GB)

(73) Assignee: SONY CORPORATION, Tokyo (JP)

( * ) Notice: Subject to any disclaimer, the term of this patent is extended or adjusted under 35 U.S.C. 154(b) by 919 days.

(21) Appl. No.: 15/024,705

(22) PCT Filed: Sep. 26, 2014

(86) PCT No.: PCT/GB2014/052917
§ 371 (c)(1),
(2) Date: Mar. 24, 2016

(87) PCT Pub. No.: WO2015/049491
PCT Pub. Date: Apr. 9, 2015

(65) Prior Publication Data
US 2016/0241852 A1    Aug. 18, 2016

(30) Foreign Application Priority Data

Oct. 1, 2013 (GB) .................................. 1317406.5
Oct. 8, 2013 (GB) .................................. 1317803.3
(Continued)

(51) Int. Cl.
*H04N 19/124*    (2014.01)
*H04N 19/129*    (2014.01)
(Continued)

(52) U.S. Cl.
CPC ......... *H04N 19/124* (2014.11); *H04N 19/107* (2014.11); *H04N 19/129* (2014.11);
(Continued)

(58) Field of Classification Search
None
See application file for complete search history.

(56) References Cited

U.S. PATENT DOCUMENTS

2005/0063462 A1* 3/2005 Lee .................... H04N 19/129
375/240.03
2008/0279465 A1   11/2008 Raveendran et al.
(Continued)

FOREIGN PATENT DOCUMENTS

CN       1890711 A    1/2007
CN     101115200 A    1/2008
(Continued)

OTHER PUBLICATIONS

U.S. Appl. No. 14/902,266, filed Dec. 30, 2015, James Alexander Gamei, et al.
(Continued)

*Primary Examiner* — Kate H Luo
(74) *Attorney, Agent, or Firm* — Oblon, McClelland, Maier & Neustadt, L.L.P.

(57) ABSTRACT

A video data encoding apparatus operable to encode an array of input video data values includes: a differential pulse code modulation (DPCM) coder configured to apply a differential pulse code modulation operation to the array of input video data values to generate an array of DPCM data values; a quantizer operable to quantize data derived from the DPCM data values; and controller circuitry controlling selection of a rounding operation by the quantizer from two or more candidate rounding operations.

20 Claims, 17 Drawing Sheets

(30) Foreign Application Priority Data

Oct. 21, 2013 (GB) .................................. 1318593.9
Nov. 25, 2013 (GB) .................................. 1320772.5

(51) Int. Cl.

| | |
|---|---|
| H04N 19/587 | (2014.01) |
| H04N 19/176 | (2014.01) |
| H04N 19/503 | (2014.01) |
| H04N 19/50 | (2014.01) |
| H04N 19/107 | (2014.01) |
| H04N 19/13 | (2014.01) |
| H04N 19/132 | (2014.01) |
| H04N 19/139 | (2014.01) |
| H04N 19/147 | (2014.01) |
| H04N 19/159 | (2014.01) |
| H04N 19/52 | (2014.01) |
| H04N 19/593 | (2014.01) |
| H04N 19/61 | (2014.01) |

(52) U.S. Cl.

CPC .......... *H04N 19/13* (2014.11); *H04N 19/132* (2014.11); *H04N 19/139* (2014.11); *H04N 19/147* (2014.11); *H04N 19/159* (2014.11); *H04N 19/176* (2014.11); *H04N 19/50* (2014.11); *H04N 19/503* (2014.11); *H04N 19/52* (2014.11); *H04N 19/587* (2014.11); *H04N 19/593* (2014.11); *H04N 19/61* (2014.11)

(56) References Cited

U.S. PATENT DOCUMENTS

| | | | | |
|---|---|---|---|---|
| 2009/0122868 | A1* | 5/2009 | Chen | H03M 7/30 375/240.22 |
| 2009/0225830 | A1* | 9/2009 | He | H04N 19/103 375/240.03 |
| 2010/0172582 | A1* | 7/2010 | Ding | H04N 19/176 382/166 |
| 2011/0292247 | A1* | 12/2011 | Gharavi-Alkhansari | H04N 19/176 348/231.99 |
| 2012/0307890 | A1* | 12/2012 | Lu | H04N 19/176 375/240.03 |
| 2013/0114716 | A1* | 5/2013 | Gao | H04N 19/593 375/240.14 |
| 2016/0241852 | A1* | 8/2016 | Gamei | H04N 19/50 |

FOREIGN PATENT DOCUMENTS

| | | |
|---|---|---|
| CN | 101310291 A | 11/2008 |
| CN | 102907101 A | 1/2013 |
| CN | 103024383 | 4/2013 |
| JP | 2012-175615 A | 9/2012 |
| JP | 2012-527160 A | 11/2012 |
| JP | 2013-504934 A | 2/2013 |
| WO | 2013/067435 | 5/2013 |
| WO | 2013/068732 | 5/2013 |

OTHER PUBLICATIONS

U.S. Appl. No. 14/778,394, filed Sep. 18, 2015, James Alexander Gamei, et al.

U.S. Appl. No. 14/779,502, filed Sep. 23, 2015, 2016-0050427 A1, David Berry, et al.

U.S. Appl. No. 14/315,498, filed Jun. 26, 2014, 2015-0382003 A1, James Alexander Gamei, et al.

Combined Chinese Office Action and Search Report dated Apr. 18, 2018 in Patent Application No. 2014800543858 (submitting English language translation only).

Office Action dated Jul. 17, 2018 in Japanese Patent Application No. 2016-519369 (submitting English language translation only), 6 pages.

He, D. et al. "Rotation of Residual Block for Transform Skipping", Research in Motion Ltd., Joint Collaborative Team on Video Coding (JCT-VC) of ITU-T SG 16 WP 3 and ISO/IEC JTC 1/SC 29/WG 11, JCTVC-J0093, Jul. 2012, pp. 1-8 (with cover pages).

K. Sharman, et al., "AHG5: Unifying DPCM," Joint Collaborative Team on Video Coding (JCT-VC) of ITU-T SG 16 WP 3 and ISO/IEC JTC 1/SC 29/WG 11, 2013, 6 pages.

M. Naccari, et al., "RCE2: Experimental results for Test C.1," Joint Collaborative Team on Video Coding (JCT-VC) of ITU-T SG 16 WP 3 and ISO/IEC JTC 1/SC 29/WG 11, 2013, 6 pages.

M. Naccari, et al., "Inter-Prediction Residual DPCM," Joint Collaborative Team on Video Coding (JCT-VC) of ITU-T SG 16 WP 3 and ISO/IEC JTC 1/SC 29/WG 11, 2013, 12 pages.

M. Karczewicz, et al., "Rate Distortion Optimized Quantization," ITU—Telecommunications Standardization Sector, 2008, 3 pages.

Great Britain Search Report dated Mar. 12, 2014 in Great Britain Patent Application No. 1317406.5 Filed Oct. 1, 2013.

International Search Report dated Dec. 3, 2014 in PCT/GB14/52917 Filed Sep. 26, 2014.

\* cited by examiner

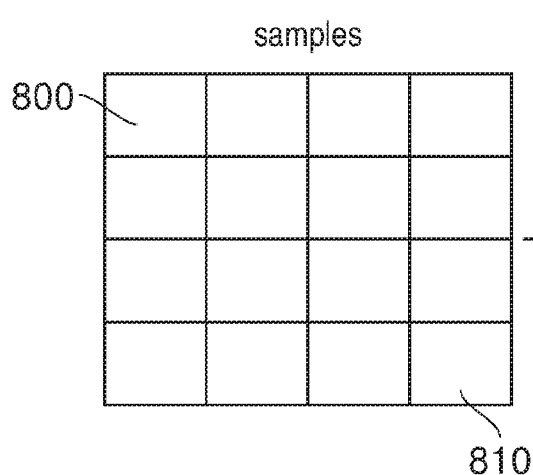
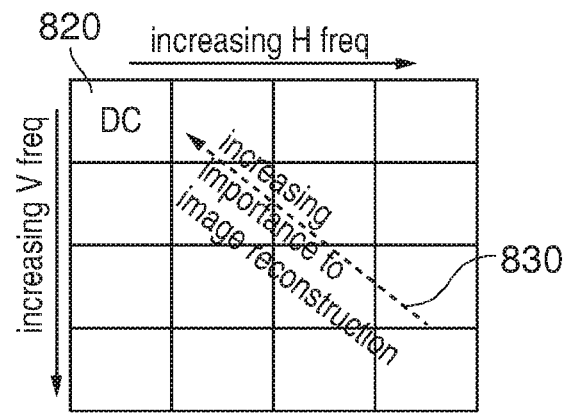
FIG. 13　　　　　FIG. 14
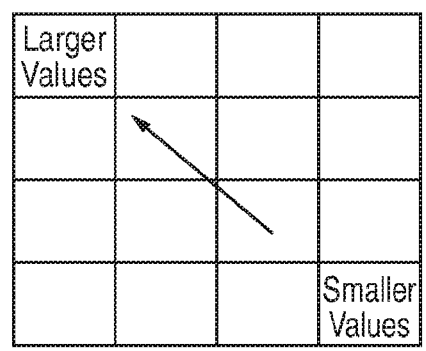
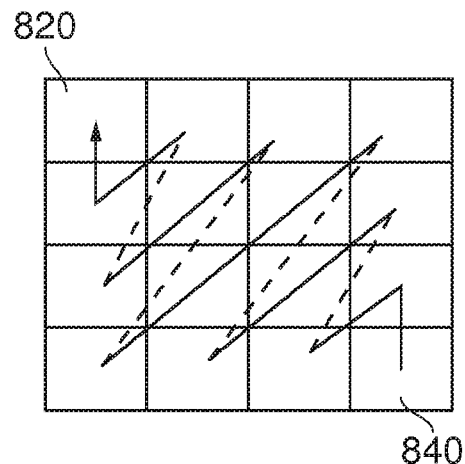
FIG. 15　　　　　FIG. 16

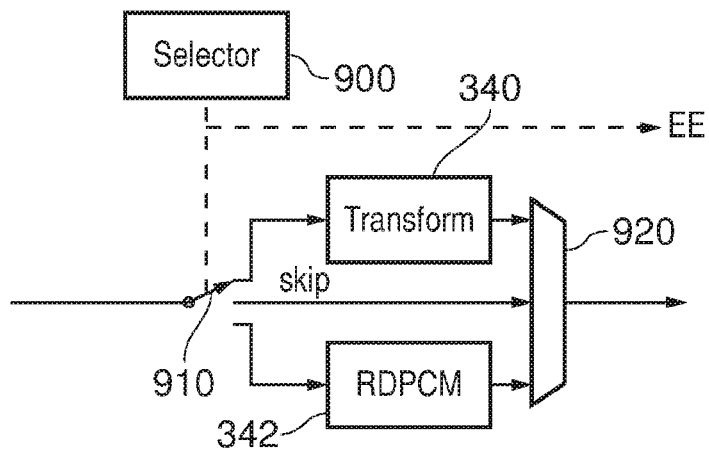
FIG. 20
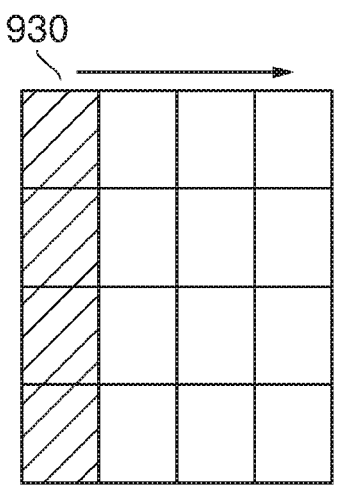
FIG. 21
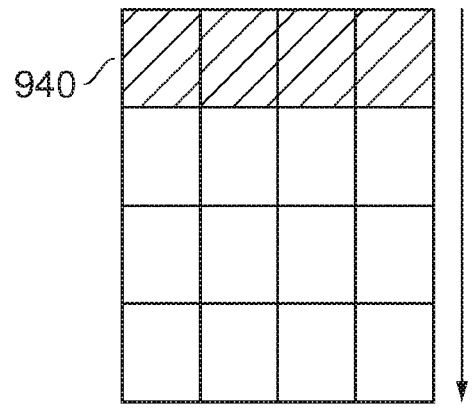
FIG. 22
FIG. 23A
FIG. 23B

| 16 | 15 | 14 | 13 |
|----|----|----|----|
| 12 | 11 | 10 | 9  |
| 8  | 7  | 6  | 5  |
| 4  | 3  | 2  | 1  |

FIG. 24A

| 1  | 2  | 3  | 4  |
|----|----|----|----|
| 5  | 6  | 7  | 8  |
| 9  | 10 | 11 | 12 |
| 13 | 14 | 15 | 16 |

FIG. 24B

| 16 | 12 | 8 | 4 |
|----|----|---|---|
| 15 | 11 | 7 | 3 |
| 14 | 10 | 6 | 2 |
| 13 | 9  | 5 | 1 |

FIG. 25A

| 1 | 5 | 9  | 13 |
|---|---|----|----|
| 2 | 6 | 10 | 14 |
| 3 | 7 | 11 | 15 |
| 4 | 8 | 12 | 16 |

FIG. 25B

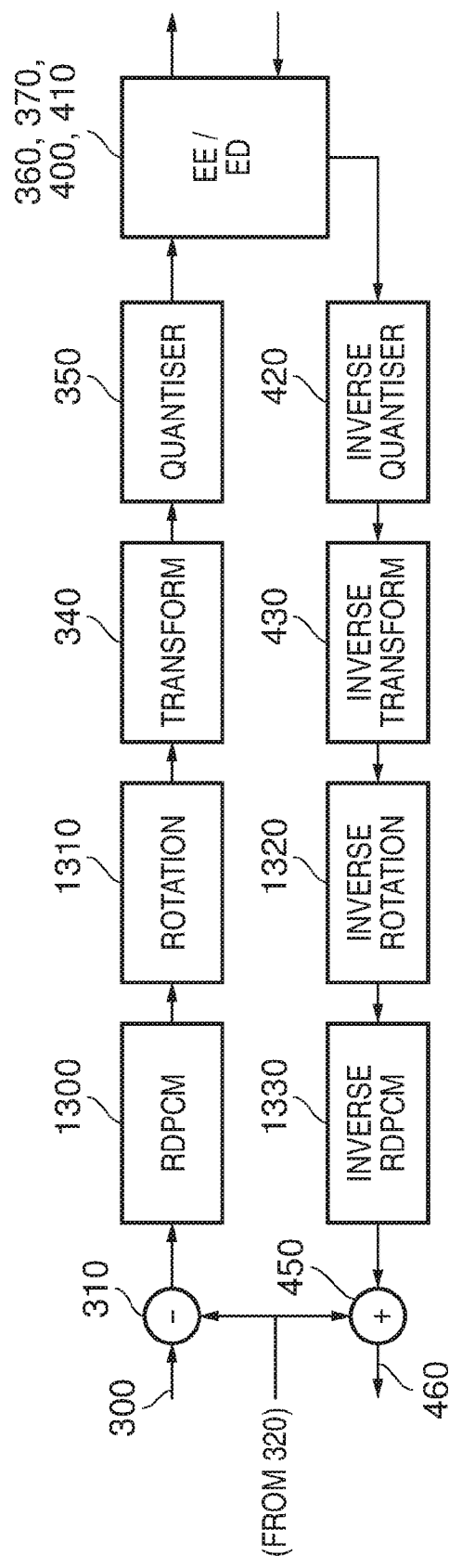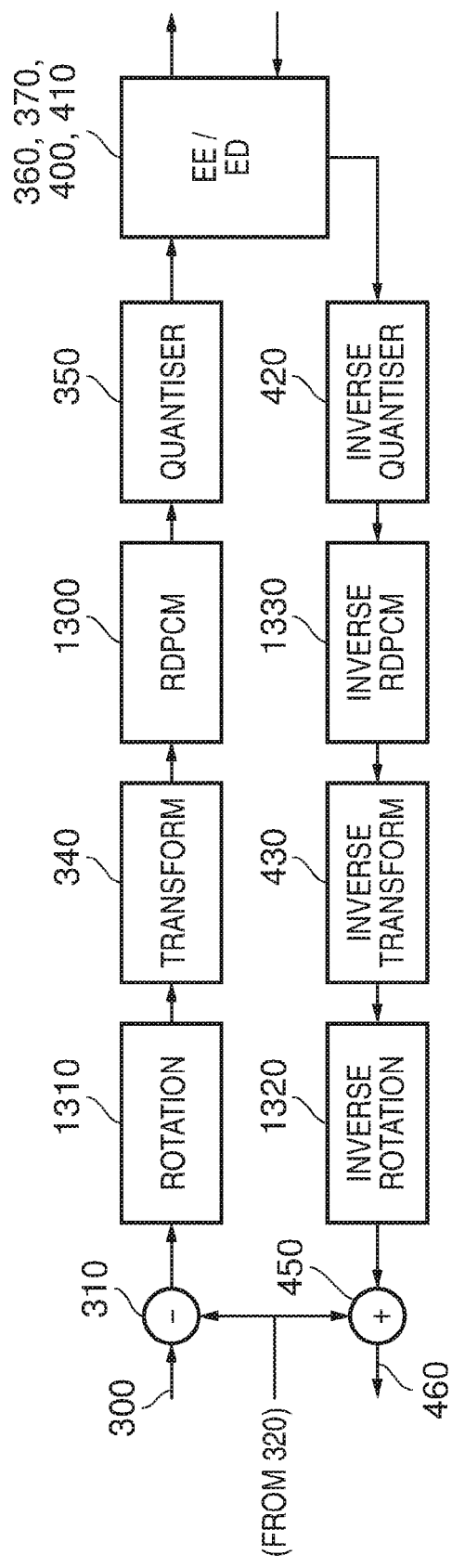
FIG. 32
FIG. 33

DATA ENCODING AND DECODING

CROSS REFERENCE TO RELATED APPLICATIONS

The present application claims the benefit of the earlier filing date of GB1317406.5, GB1317803.3, GB1318593.9 and GB1320772.5 filed in the United Kingdom Intellectual Property Office on 1 Oct. 2013, 8 Oct. 2013, 21 Oct. 2013 and 25 Nov. 2013 respectively, the entire contents of which applications are incorporated herein by reference.

FIELD OF THE DISCLOSURE

This disclosure relates to data encoding and decoding.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

There are several video data compression and decompression systems which involve transforming video data into a frequency domain representation, quantising the frequency domain coefficients and then applying some form of entropy encoding to the quantised coefficients.

The transformation into the spatial frequency domain at the encoder side corresponds to an inverse transformation at the decoder side. Example transformations include the so-called discrete cosine transformation (DCT) and the so-called discrete sine transformation (DST). In some examples the transformations are carried out by matrix-multiplying an array of input samples (derived from the video data to be coded) by a matrix of transformation coefficients to generate frequency-transformed data. Frequency-transformed data is converted back to sample data, from which output video data can be derived, by matrix-multiplying an array of the frequency-transformed data by a matrix of inverse-transformation coefficients.

Some standards and draft standards, such as the so-called High Efficiency Video Coding (HEVC) standards, define encoding and decoding modes in which a spatial frequency transformation is not in fact used. These are sometimes referred to as "transform skip" or "trans-quant skip" ("trans-quant" being an abbreviation for "transformation and quantisation") modes.

SUMMARY

An aspect of this disclosure is defined by claim 1.

Further respective aspects and features are defined in the appended claims.

It is to be understood that both the foregoing general description and the following detailed description are exemplary, but not restrictive of, the present disclosure.

BRIEF DESCRIPTION OF THE DRAWINGS

A more complete appreciation of the disclosure and many of the attendant advantages thereof will be readily obtained as the same becomes better understood by reference to the following detailed description of embodiments, when considered in connection with the accompanying drawings, wherein:

FIG. 13 schematically illustrates an array of samples;

FIG. 14 schematically illustrates an array of frequency-separated coefficients;

FIG. 15 schematically illustrates a trend within the array of FIG. 14;

FIG. 16 schematically illustrates a reverse scan;

FIG. 20 schematically illustrates part of an encoder;

FIGS. 21 and 22 schematically illustrate an RDPCM operation;

FIGS. 23a and 23b schematically illustrate trends in RDPCM data arrays;

FIGS. 24a and 24b schematically illustrate changes to a scanning order for vertically encoded RDPCM data;

FIGS. 25a and 25b schematically illustrate changes to a scanning order for horizontally encoded RDPCM data;

FIG. 32 schematically indicates a part of an encoder and/or decoder operating in respect of intra-image encoded blocks;

FIG. 33 schematically indicates a part of an encoder and/or decoder operating in respect of inter-image encoded blocks;

FIG. 36 schematically illustrates a block of dc values;

FIG. 37a schematically illustrates the block of FIG. 36 after a horizontal DPCM process;

FIG. 37b schematically illustrates the block of FIG. 37a after a rotation operation;

FIG. 38a schematically illustrates the block of FIG. 36 after a vertical DPCM process;

FIG. 38b schematically illustrates the block of FIG. 38a after a rotation operation;

DESCRIPTION OF THE EMBODIMENTS

Figure 1:
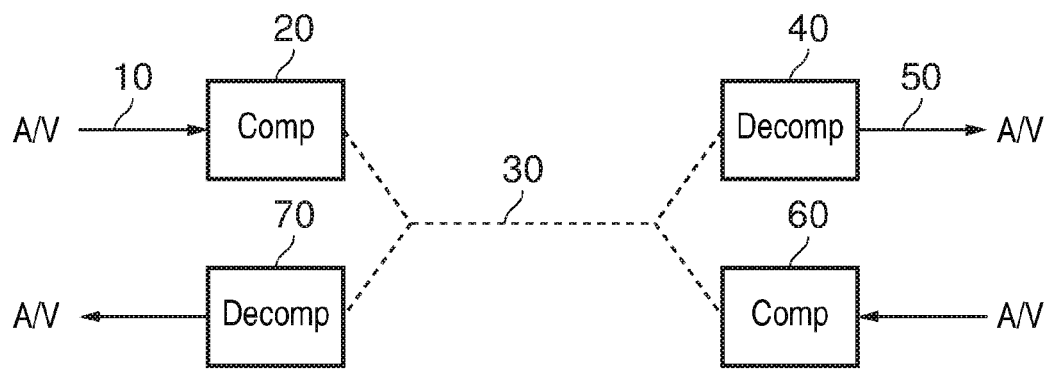
FIG. 1 schematically illustrates an audio/video (A/V) data transmission and reception system using video data compression and decompression.

Referring now to the drawings, FIGS. 1-4e are provided to give schematic illustrations of apparatus or systems making use of the compression and/or decompression apparatus to be described below in connection with embodiments.

All of the data compression and/or decompression apparatus is to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory machine-readable data storage media by which such software and/or firmware are stored or otherwise provided, are considered as embodiments.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is uni-directional, only one of the nodes would require a compression apparatus and the other node would only require a decompression apparatus.

Figure 2:
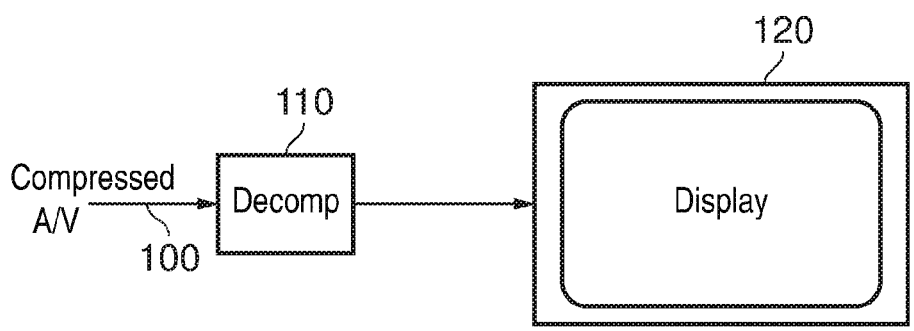
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 might be provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
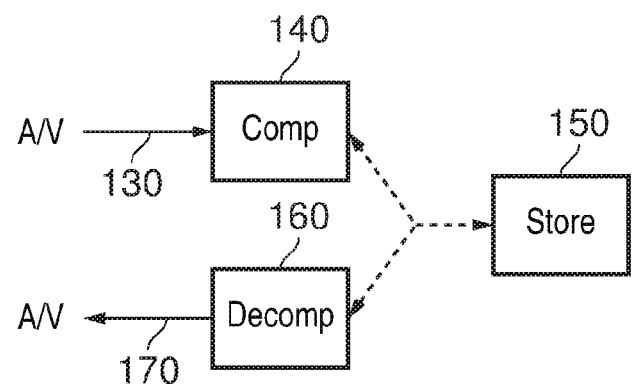
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the store device 150 and passed to a decompression apparatus 160 for decompression to provide an output audio/video signal 170.

It will be appreciated that the compressed or encoded signal, and a storage medium or data carrier storing that signal, are considered as embodiments. Reference is made to FIGS. 4d and 4e described below.

Figure 4A:
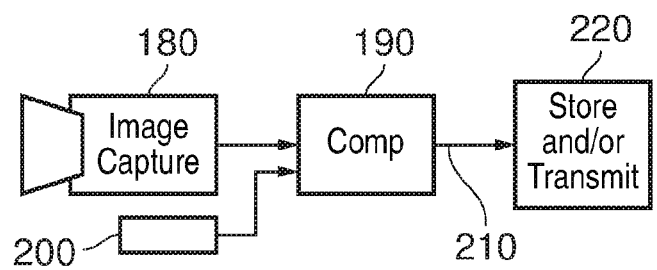
FIG. 4a schematically illustrates a video camera using video data compression.

FIG. 4a schematically illustrates a video camera using video data compression. In FIG. 4a, and image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4e) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

Figure 4B:
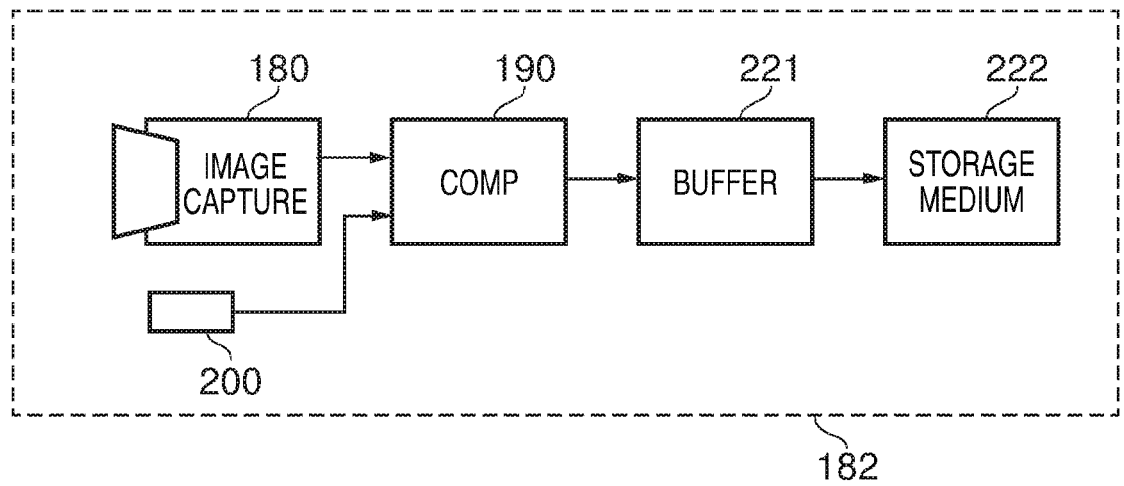
FIG. 4b schematically illustrates an example video camera in more detail.

FIG. 4b schematically illustrates an example video camera apparatus 183 in more detail. Those features numbered in common with FIG. 4a will not be described further. FIG. 4b is an example of the camera of FIG. 4a (in the case that the unit 220 of FIG. 4a provides a storage capability) in which the compressed data are first buffered by a buffer 221 and then stored in a storage medium 222 such as a magnetic disk, an optical disk, flash memory, a so-called solid-state disk drive (SSD) or the like. Note that the arrangement of FIG. 4b can be implemented as a single (physical) unit 182.

Figure 4C:
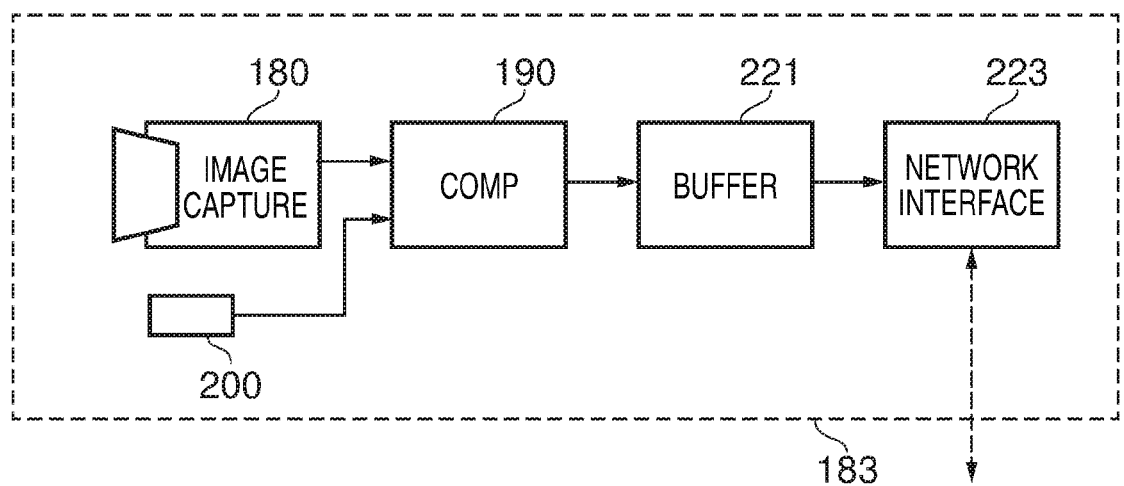
FIG. 4c schematically illustrates another example video camera.
Figure 4D:
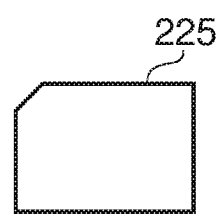
FIGS. 4d and 4e schematically illustrate data carriers.
Figure 4E:
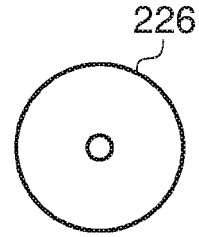

FIG. 4c schematically illustrates another example video camera in which, in place of the storage arrangement of FIG. 4b, a network interface 223 is provided in order to allow the compressed data to be transmitted to another unit (not shown). The network interface 223 can also allow for incoming data to be received by the video camera, such as control data. Note that the arrangement of FIG. 4b can be implemented as a single (physical) unit 183.

FIGS. 4d and 4e schematically illustrate data carriers, for example for use as the storage medium 222 and carrying compressed data which has been compressed according to the compression techniques described in the present application. FIG. 4d shows a schematic example of a removable non-volatile storage medium 225 implemented as solid state memory such as flash memory. FIG. 4e shows a schematic example of a removable non-volatile storage medium 226 implemented as a disk medium such as an optical disk.

Figure 5:
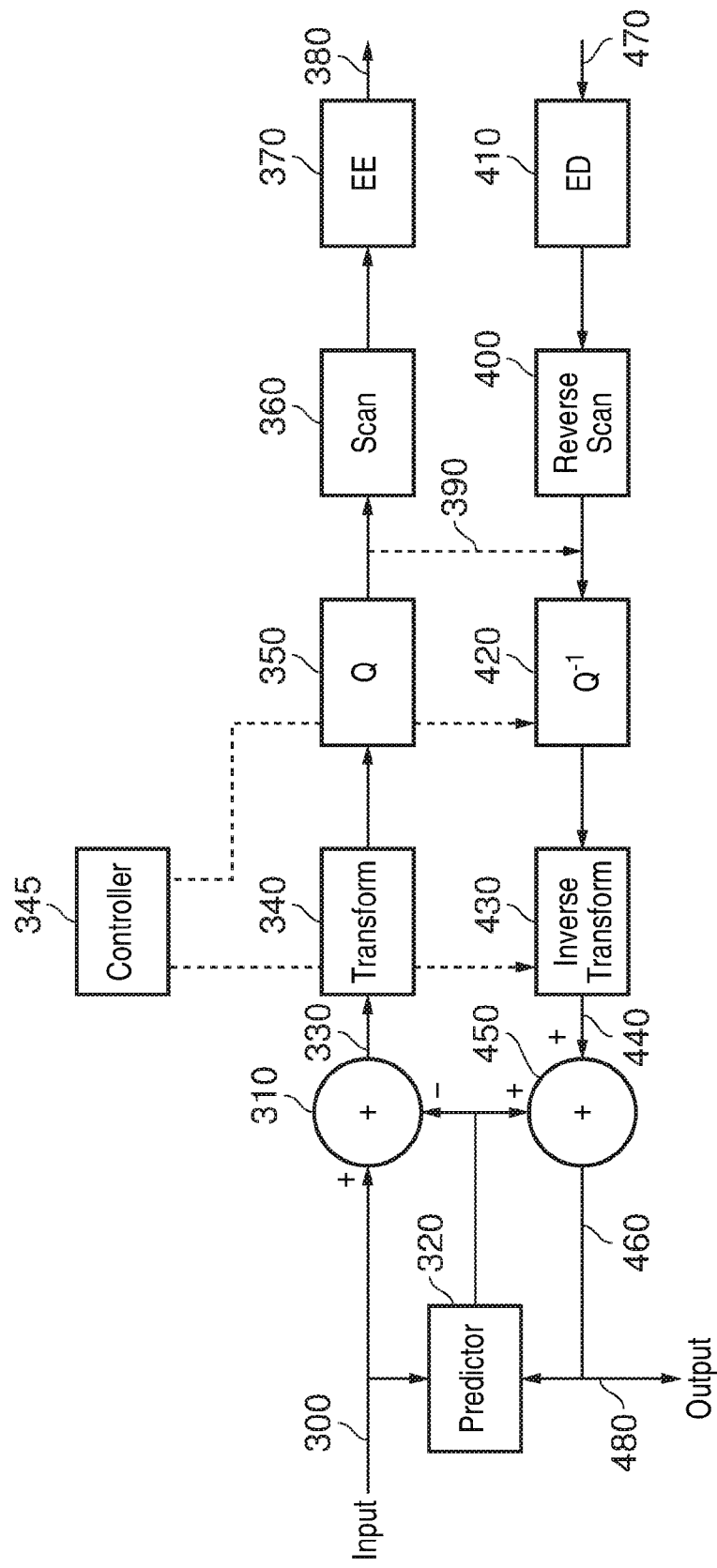
FIG. 5 provides a schematic overview of a video data compression and decompression apparatus.

FIG. 5 provides a schematic overview of a video data compression and decompression apparatus.

Successive images of an input video signal 300 are supplied to an adder 310 and to an image predictor 320. The image predictor 320 will be described below in more detail with reference to FIG. 6. The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tends to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well, the expectation is that the residual image data will contain less information (less energy) than the input image and so will be easier to encode into a small amount of encoded data.

The residual image data 330 is supplied to a transform unit 340 which generates a discrete cosine transform (DCT) representation of the residual image data. The DCT technique itself is well known and will not be described in detail here. There are however aspects of the techniques used in the present apparatus which will be described in more detail below, in particular relating to the selection of different blocks of data to which the DCT operation is applied. These will be discussed with reference to FIGS. 7-12 below.

Note that in some embodiments, a discrete sine transform (DST) is used instead of a DCT. In other embodiments, no transform might be used. This can be done selectively, so that the transform stage is, in effect, bypassed, for example under the control of a "transform skip" command or mode.

The output of the transform unit 340, which is to say, a set of transform coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process work more efficiently in generating small amounts of compressed video data.

A controller 345 controls the operation of the transform unit 340 and the quantiser 350 (and their respective inverse units), according to techniques to be discussed further below. Note that the controller 345 may also control other aspects of the operation of the apparatus of FIG. 5.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called zigzag scanning order.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes.

The output of the entropy encoder 370, along with additional data, for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered to be "lossless", which is to say that it can be reversed to arrive at exactly the same data which was first supplied to the entropy encoder 370. So, the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420.

In general terms, an entropy decoder 410, the reverse scan unit 400, an inverse quantiser 420 and an inverse transform unit 430 provide the respective inverse functions of the entropy encoder 370, the scan unit 360, the quantiser 350 and the transform unit 340. For now, the discussion will continue through the compression process; the process to decompress an input compressed video signal corresponds to the return path of the compression process.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320.

Turning now to the process applied to a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. In straightforward terms, the output 460 of the adder 450 forms the output decompressed video signal 480. In practice, further filtering may be applied before the signal is output.

Figure 6:
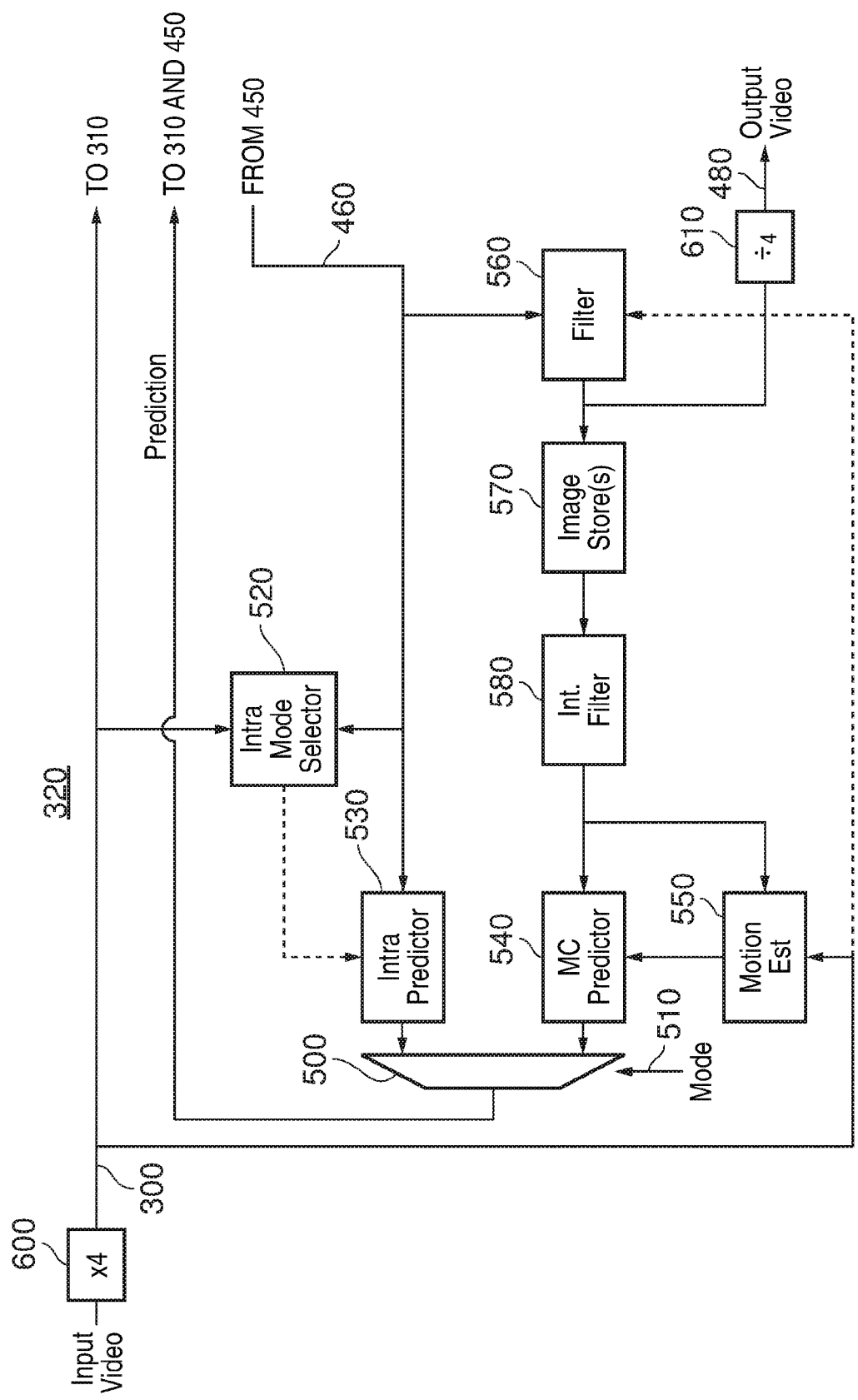
FIG. 6 schematically illustrates the generation of predicted images.
Figure 7:
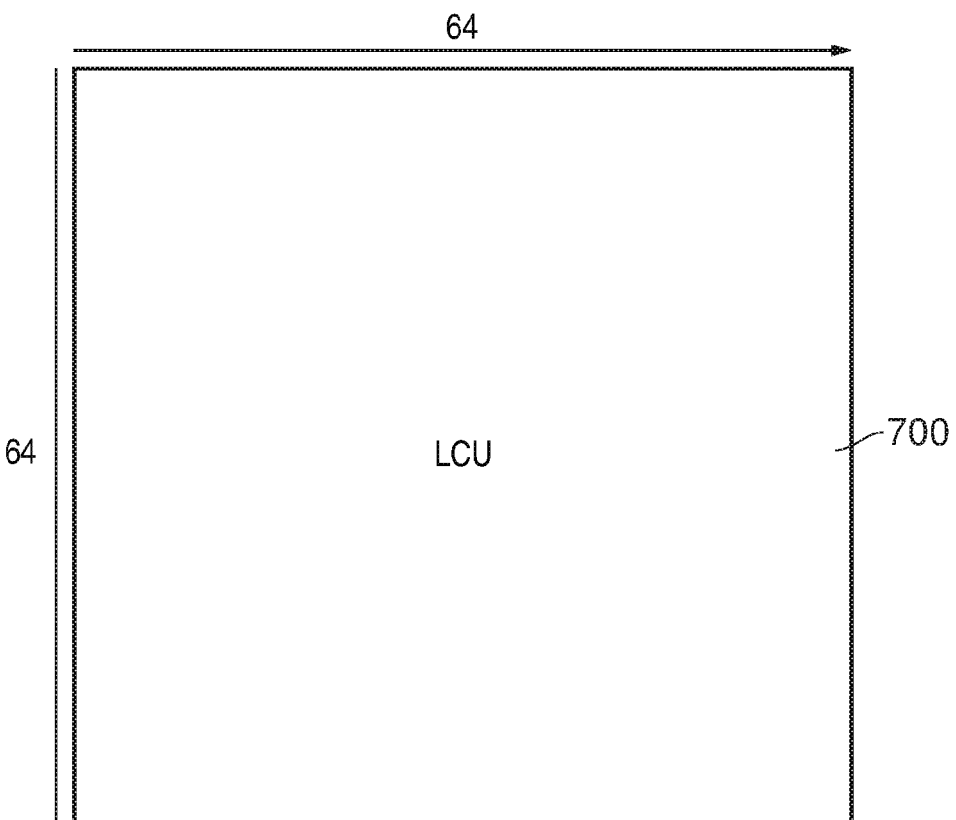
FIG. 7 schematically illustrates a largest coding unit (LCU)

FIG. 6 schematically illustrates the generation of predicted images, and in particular the operation of the image predictor 320.

There are two basic modes of prediction: so-called intra-image prediction and so-called inter-image, or motion-compensated (MC), prediction.

Intra-image prediction bases a prediction of the content of a block of the image on data from within the same image. This corresponds to so-called I-frame encoding in other video compression techniques. In contrast to I-frame encoding, where the whole image is intra-encoded, in the present embodiments the choice between intra- and inter-encoding can be made on a block-by-block basis, though in other embodiments the choice is still made on an image-by-image basis.

Motion-compensated prediction makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

Returning to FIG. 6, two image prediction arrangements (corresponding to intra- and inter-image prediction) are shown, the results of which are selected by a multiplexer 500 under the control of a mode signal 510 so as to provide blocks of the predicted image for supply to the adders 310 and 450. The choice is made in dependence upon which selection gives the lowest "energy" (which, as discussed above, may be considered as information content requiring encoding), and the choice is signalled to the encoder within the encoded output data stream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

The processing applied to the signal 460 will now be described. Firstly, the signal is filtered by a filter unit 560. This involves applying a "deblocking" filter to remove or at least tend to reduce the effects of the block-based processing carried out by the transform unit 340 and subsequent operations. Also, an adaptive loop filter is applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data stream.

The filtered output from the filter unit 560 in fact forms the output video signal 480. It is also buffered in one or more image stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 8 times (in each dimension) that of the images stored in the image stores 570. The interpolated images are passed as an input to the motion estimator 550 and also to the motion compensated predictor 540.

In embodiments, a further optional stage is provided, which is to multiply the data values of the input video signal by a factor of four using a multiplier 600 (effectively just shifting the data values left by two bits), and to apply a corresponding divide operation (shift right by two bits) at the output of the apparatus using a divider or right-shifter 610. So, the shifting left and shifting right changes the data purely for the internal operation of the apparatus. This measure can provide for higher calculation accuracy within the apparatus, as the effect of any data rounding errors is reduced.

The way in which an image is partitioned for compression processing will now be described. At a basic level, and image to be compressed is considered as an array of blocks of samples. For the purposes of the present discussion, the largest such block under consideration is a so-called largest coding unit (LCU) 700 (FIG. 7), which represents a square array of 64×64 samples. Here, the discussion relates to luminance samples. Depending on the chrominance mode, such as 4:4:4, 4:2:2, 4:2:0 or 4:4:4:4 (GBR plus key data), there will be differing numbers of corresponding chrominance samples corresponding to the luminance block.

Three basic types of blocks will be described: coding units, prediction units and transform units. In general terms, the recursive subdividing of the LCUs allows an input picture to be partitioned in such a way that both the block sizes and the block coding parameters (such as prediction or residual coding modes) can be set according to the specific characteristics of the image to be encoded.

Figure 8:
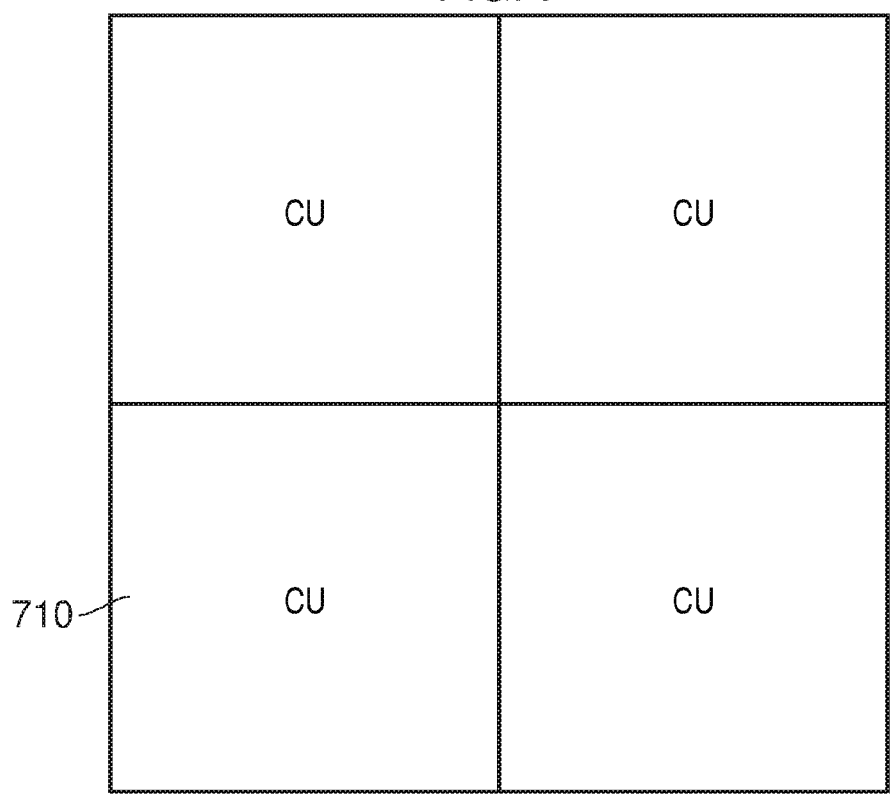
FIG. 8 schematically illustrates a set of four coding units (CU)
Figure 9:
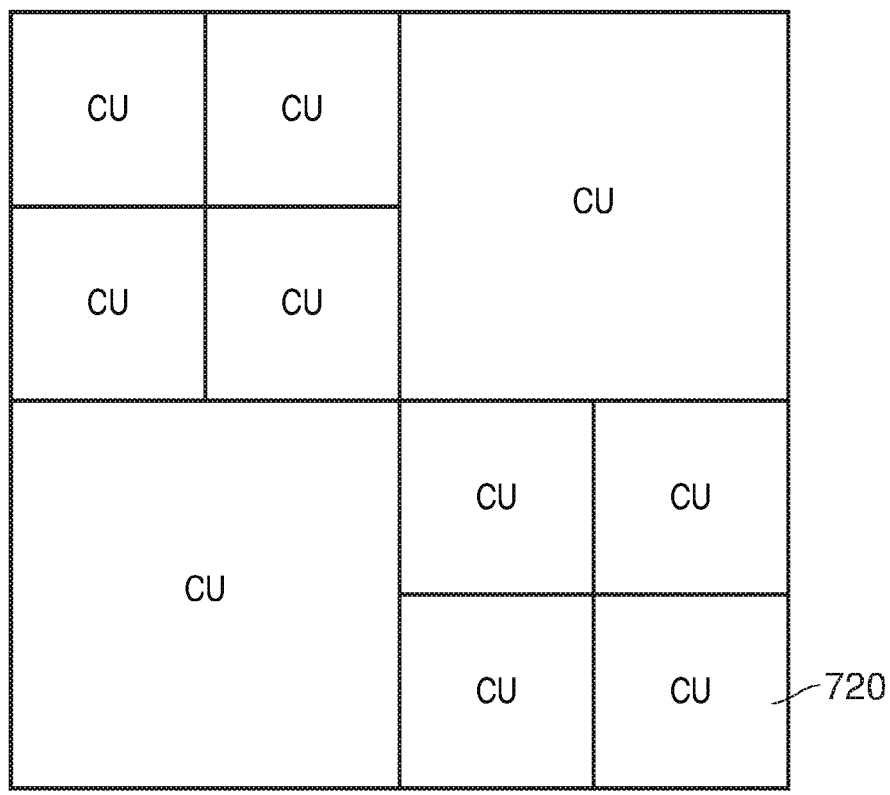
FIGS. 9 and 10 schematically illustrate the coding units of FIG. 8 sub-divided into smaller coding units.
Figure 10:
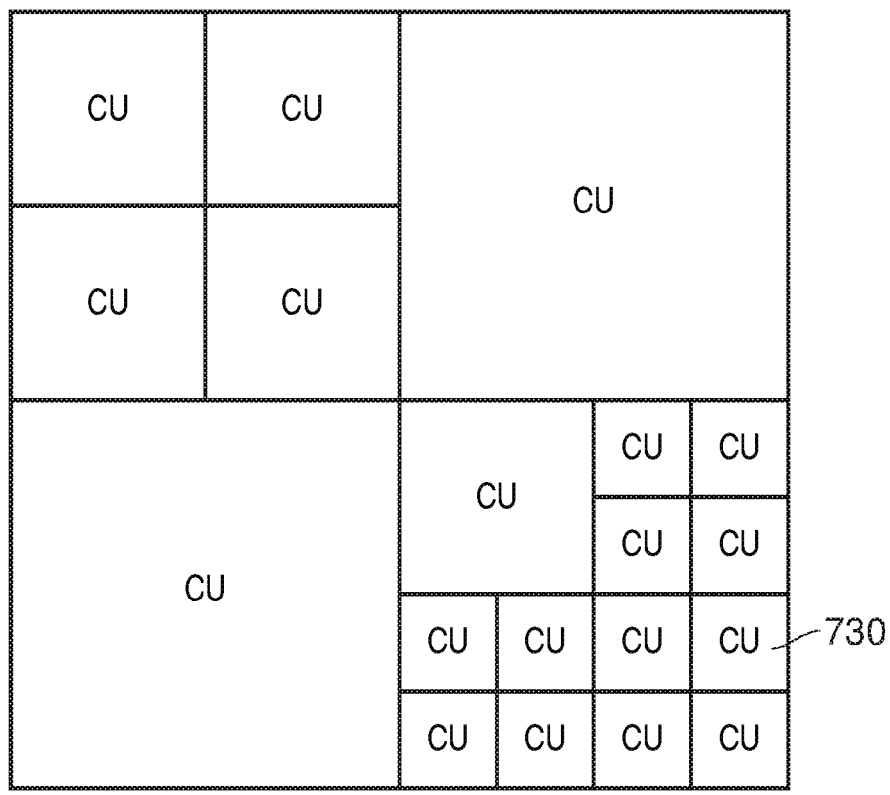

The LCU may be subdivided into so-called coding units (CU). Coding units are always square and have a size between 8×8 samples and the full size of the LCU 700. The coding units can be arranged as a kind of tree structure, so that a first subdivision may take place as shown in FIG. 8, giving coding units 710 of 32×32 samples; subsequent subdivisions may then take place on a selective basis so as to give some coding units 720 of 16×16 samples (FIG. 9) and potentially some coding units 730 of 8×8 samples (FIG. 10). Overall, this process can provide a content-adapting coding tree structure of CU blocks, each of which may be as large as the LCU or as small as 8×8 samples. Encoding of the output video data takes place on the basis of the coding unit structure.

Figure 11:
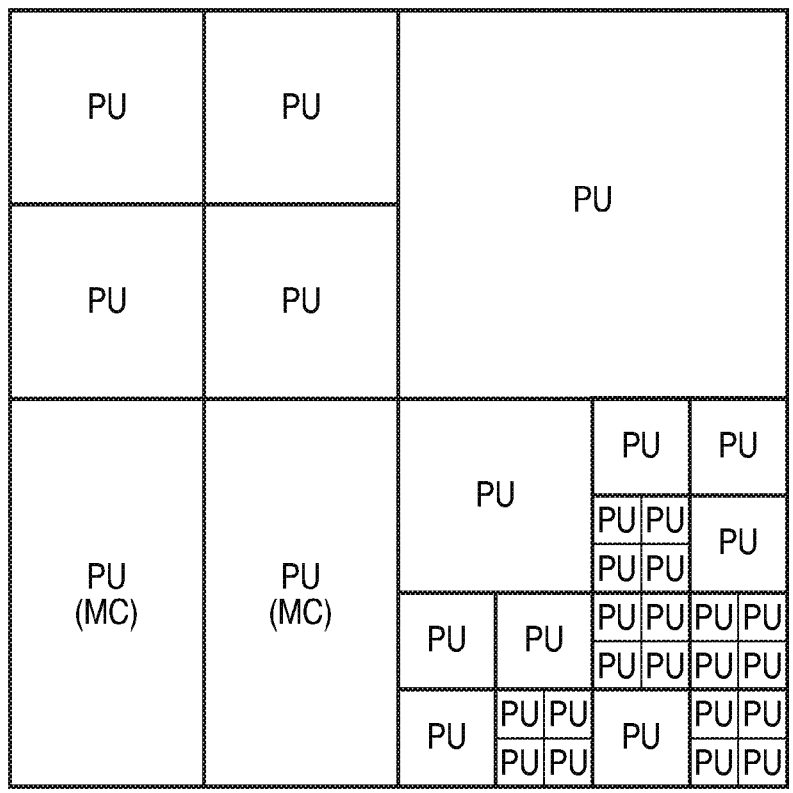
FIG. 11 schematically illustrates an array of prediction units (PU)

FIG. 11 schematically illustrates an array of prediction units (PU). A prediction unit is a basic unit for carrying information relating to the image prediction processes, or in other words the additional data added to the entropy encoded residual image data to form the output video signal from the apparatus of FIG. 5. In general, prediction units are not restricted to being square in shape. They can take other shapes, in particular rectangular shapes forming half of one of the square coding units, as long as the coding unit is greater than the minimum (8×8) size. The aim is to allow the boundary of adjacent prediction units to match (as closely as possible) the boundary of real objects in the picture, so that different prediction parameters can be applied to different real objects. Each coding unit may contain one or more prediction units.

Figure 12:
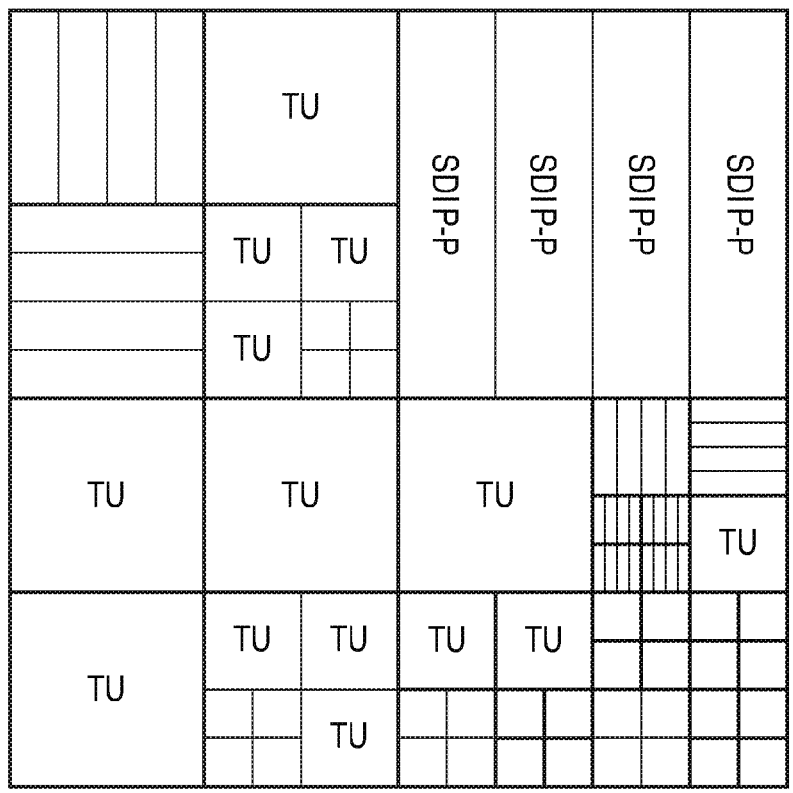
FIG. 12 schematically illustrates an array of transform units (TU)

FIG. 12 schematically illustrates an array of transform units (TU). A transform unit is a basic unit of the transform and quantisation process. Transform units are always square and can take a size from 4×4 up to 32×32 samples. Each coding unit can contain one or more transform units. The acronym SDIP-P in FIG. 12 signifies a so-called short distance intra-prediction partition. In this arrangement only one dimensional transforms are used, so a 4×N block is passed through N transforms with input data to the transforms being based upon the previously decoded neighbouring blocks and the previously decoded neighbouring lines within the current SDIP-P.

FIG. 13 schematically illustrates an array of samples. These in fact represent samples of the residual image 330 discussed above, and are drawn at their appropriate relative spatial positions, which is to say that a sample 800 lies at the upper left corner of an array of 4×4 adjacent samples, and a sample 810 lies at the bottom right corner of such an array, with respect to positions of those samples within an image.

It will of course be appreciated that the 4×4 array of FIG. 13 is just an example; the techniques and attributes discussed here can apply to arrays of various different sizes such as 8×8, 16×16, 32×32 and so on.

The samples of FIG. 13 are processed by the transform unit 340 to generate frequency-separated coefficients. FIG. 14 schematically illustrates an array of such frequency-separated coefficients. Here, the position of a coefficient within the array represents the spatial frequencies corresponding to that coefficient. By convention, a so-called DC coefficient 820 occupies the upper-left array position. Moving towards the right within the array of FIG. 14 indicates an increasing horizontal frequency component, and moving towards the bottom of the array of FIG. 14 indicates an increasing vertical frequency component. Note that although it is just a convention to represent the array of coefficients in this manner (rather than, for example, having the DC coefficient in the bottom-right corner), the ordering of the coefficients is technically relevant to other parts of the process. One reason for this is schematically illustrated by a broken-line arrow 830 in FIG. 14, which indicates that moving from the bottom-right to the top-left positions within the array of FIG. 14 corresponds to a generally increasing importance of the coefficients to image reconstruction. That is to say, in order to reconstruct the array or block of samples of FIG. 13, the most important one of the coefficients of FIG. 14 is the DC coefficient 820, followed in terms of importance by the lower horizontal and vertical frequency coefficients.

In general terms, this trend of importance can also correspond to a trend in terms of coefficient magnitude, in that the magnitude of the DC coefficient can tend to be the largest within the set of coefficients derived from a block of samples. FIG. 15 schematically illustrates such a trend within the array of FIG. 14, in which smaller values tend to be towards the lower right of the array and larger values tend to be towards the upper left of the array. Of course, a specific individual array of coefficients may differ from this general trend.

One way in which the trends discussed above are technically relevant relates to the entropy encoding stage carried out by the entropy encoder 370 in FIG. 5. A general principle applied to this type of entropy encoding is that it operates more efficiently by dealing with smaller-magnitude data values within a block before dealing with larger-magnitude data values. Accordingly, in the case that frequency separated coefficients are subjected to entropy encoding (whether or not an intervening quantisation stage is used) a so-called "reverse scan" pattern is used to select data in an appropriate order for entropy encoding. FIG. 16 schematically illustrates an example of a reverse scan. This example relates to a so-called reverse-diagonal scan which starts with the coefficient 840 in the lower-right corner of the array of coefficients and progresses up to the DC coefficient 820 according to the diagonal scanning pattern shown. This pattern means that, generally speaking, smaller value coefficients are encoded before larger value coefficients. This is an example of the entropy encoder being operable in a second mode to apply a processing order starting from an array position corresponding to that of a highest frequency component and ending at an array position corresponding to that of a lowest frequency component.

The order in which the coefficients are handled is also relevant to a so-called rate-distortion-optimised quantisation (RDOQ) process. In order to explain this, firstly some aspects of the quantisation process will be described, and then the RDOQ system will be discussed.

In embodiments, quantisation is applied as a division of the coefficient magnitudes (the coefficient signs being preserved separately) in a transform unit (TU) by a quantisation divisor qStep derived from a quantisation parameter applicable to that block, Qp, according to:

$$q\text{Step}=\text{base}Q\text{Step}[Qp\%\ 6]<<int \quad (Qp/6)$$

Here, the percentage sign % indicates a modulus function, so that A % B is equal to the remainder when A is divided by B. The << sign indicates a left bit-shift by the value given after the << sign, so that, for example, << 3 represents a left shift by three bit positions. The variable baseQStep is a function of an index, varying between 0 and 5, represented by Op % 6. So, a (potentially) different value of baseQStep applies according to the relevant index Qp % 6. The function int indicates an integer value.

For ease of calculation, the reciprocal of baseQStep is pre-calculated in some embodiments of an encoder, and left-shifted by a number of bits such as 14 bits, to give values of inverseQStep which are then multiplied by the coefficient magnitudes. A reason for this is that multiplication operations are more straightforward to implement in some arrangements than division operations.

This gives a combined operation as follows:

$$\text{output}=((\text{input}\times\text{inverse}Q\text{Step})+\text{rounding})<<q\text{Bits}$$

where qBits=14+int (Qp/6)+transformShift

Here, transformShift represents a compensation for any additional shifting imposed by the DCT process.

In some embodiments, so-called scaling lists are used as a mechanism to further vary the degree of quantisation applicable to different coefficients in the TU. Each coefficient position is associated with a corresponding entry in the scaling list. The scaling list value is used to alter the quantisation divisor. In some embodiments, a scaling list value of decimal 16 corresponds to no change, which is to say that it leaves the divisor unchanged. In some embodiments, the scaling list values are used to modify the value inverseQStep used in the equations above, so that:

$$\text{inverse}Q\text{Step}=(\text{inverse}Q\text{Step}<<4)/\text{scaling list value}$$

Figure 17A:
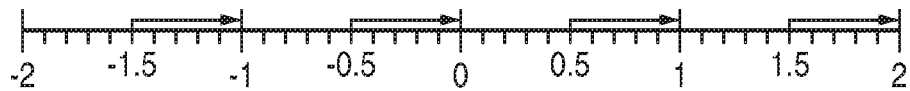
FIGS. 17a-17c schematically illustrate rounding techniques.
Figure 17B:
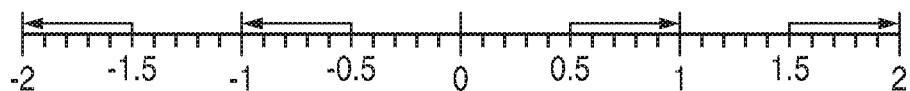
Figure 17C:
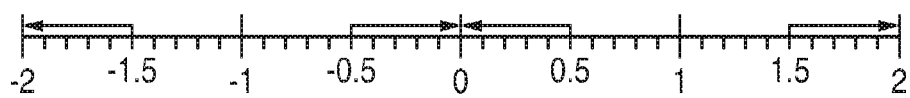

A variable "rounding" was introduced above. Before the right-shift by qBits, a value is added in order to round the final result. Rounding can be applied by a number of methods. FIGS. 17a-17c schematically illustrate example rounding techniques. Note that these diagrams show a typical rounding point of 0.5, but other rounding points may be used. FIG. 17a schematically illustrates so-called positive rounding, in which a value which is between two integers is rounded to the greater of the two surrounding integers. FIG. 17b schematically illustrates so-called infinity rounding, in which a value which is between two integers is rounded to the nearest integer of the higher magnitude. FIG. 17c schematically illustrates so-called even rounding, in which a value which is between two integers is rounded to the nearest even integer. Note that even rounding is not used in embodiments of the HEVC system.

These are all examples of conventional rounding. As an alternative, RDOQ can be used. This is a technique for selecting a rounding regime based upon an estimate of a cost function, so as to aim towards achieving a minimum cost for the selected regime, where the cost depends upon both the error obtained using that rounding regime and also the number of bits required to encode data rounded according to that rounding regime.

Figure 18:
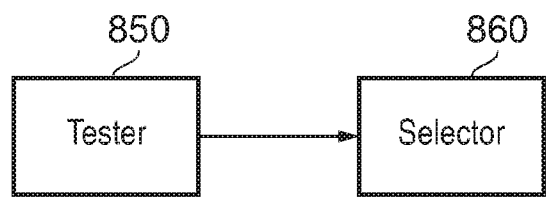
FIG. 18 schematically illustrates an RDOQ apparatus.
Figure 19A:
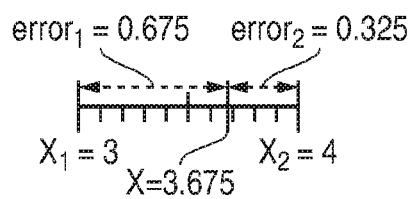
FIGS. 19a and 19b schematically illustrate the operation of the apparatus of FIG. 18.
Figure 19B:
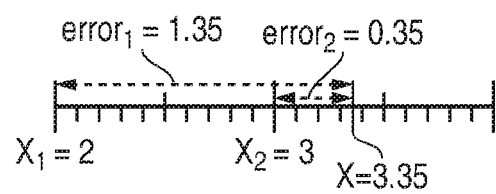

FIG. 18 schematically illustrates an RDOQ apparatus comprising a tester 850 which executes tests of various rounding regimes as discussed below, and a selector 860 which selects a rounding regime providing the lowest cost function. Note that in practice, these functions can be carried out by the controller 345. FIGS. 19a and 19b schematically illustrate the operation of the apparatus of FIG. 18 and will be described below.

As mentioned, RDOQ can be used instead of conventional rounding, so that the RDOQ techniques and apparatus described here can be implemented as part of the quantiser 350, possibly under the control of the controller 345, to provide operation in accordance with RDOQ for that quantiser 350. The steps for a TU are as follows:

For each quantised coefficient of magnitude X, candidate integers are determined as follows:

$$X_1=int(X) \text{ and } X_2=int(X)+1, \text{ if } (X\%1)>0.5$$

$$X_1=int(X)-1 \text{ and } X_2=int(X), \text{ otherwise}$$

If $X_2$ is less than 3, a third candidate $X_0$ is provided. $X_0$ has the value of 0.

If X is less than 0.5, $X_0$ is selected. Otherwise, for each of the candidate integers, an absolute error (error($X_i$)) from the true value of X is calculated, the number of bits requires to encode the candidate is estimated, and the cost function of each candidate $X_i$ is calculated as:

$$\text{cost}(X_i)=((\text{error}(X_i)<<q\text{Bits})^2\times\text{errorScale})+(\text{bits}(X_i)\times\text{lambda})$$

Here, errorScale is a scaling factor applied is a weighting against the square of the error, and lambda is a scaling factor applied as a weighting against the estimate of the number of bits.

The candidate with the lowest cost is selected. This provides an example of controlling selection of a rounding operation by the quantiser from two or more candidate rounding operations.

FIGS. 19a and 19b schematically illustrate examples of the error values, in the case that $X_1=3$ and $X_2=4$ (FIG. 19a) and in the case that $X_1=2$ and $X_2=3$ (FIG. 19b). In both of these example illustrations, $X_2$ is clearly the better choice from merely the point of view of reducing errors, but if $X_1$ requires fewer bits than $X_2$ to encode, then $X_1$ may in fact be the better choice overall. This choice is determined by calculation of the cost function.

For each group of coefficients in the TU, a cost is calculated for the case where all coefficients are quantised to 0. If this is lower than the total cost of coding the group, all 16 coefficients are replaced by 0.

The TU is scanned in reverse-scan order, corresponding to the order of entropy encoding as discussed above. For each coefficient X, the cost C of having X as the last non-zero coefficient in the TU is calculated. The coefficient $X_L$ with the lowest cost C is selected to be the last. A check is included such that $X_L$ cannot precede (in scan order) any coefficient with a magnitude greater than 1.

FIG. 20 schematically illustrates part of an encoder and represents a modification of the operation of the transform unit 340 of FIG. 5. Note that a corresponding modification would be provided to the inverse transform unit 430.

A selector 900, which may in fact be implemented as part of the functionality of the controller 345, is provided to select (using a schematic switch 910) between three modes of operation, namely a mode in which a frequency transform is used (routing the data via the transform unit 340), a transform skip mode in which no transform is employed, and a so-called RDPCM (residual differential pulse code modulation) mode using an RDPCM unit 342. Data which has been handled by any of the three routes is combined by an output multiplexer 920. Note that the selector 900 may also control part of the operation of the entropy encoder 370; this feature will be discussed further below. Note also that the transform operation can be omitted in a so-called trans-quant bypass mode, in which neither the transform nor the quantisation operations are applied.

FIGS. 21 and 22 schematically illustrate an RDPCM operation. The operation is applied to a block of residual data 330, an example of which is schematically illustrated in FIG. 21. In FIG. 21, an example block of 4×4 samples is used, but the techniques are applicable to other block sizes. Each sample in the block is given a unique letter reference from A to P in order that the effect of the RDPCM process may be illustrated in FIG. 22.

RDPCM may be applied in a horizontal (left to right) sense or a vertical (top to bottom) sense. FIG. 22 schematically illustrates the horizontal RDPCM process, but it will be appreciated that the same techniques are applicable to the vertical process.

Referring to FIG. 22, a left-hand column of samples (A, E, I, M) remain unchanged by the coding process. After that, each successive sample along a row is encoded in terms of the difference between that sample and a reconstructed version of the sample to its left. Here, the term "reconstructed" refers to the value of that sample after it has been encoded and then decoded (so that both the encode and decode are working with respect to data available to the decoder). An asterisk (*) is used to signify a reconstructed version of a sample so that, for example, B* represents a reconstructed version of the sample B. So, the sample B is encoded by the value (B−A*), the sample K is encoded by the value (K−J*) and so on. RDPCM coding can be used in intra-image-encoding or inter-image-encoding. In examples of the HEVC system, in intra-image-encoding, horizontal RDPCM is used in a horizontal prediction mode, which in turn determines the scan order as a reverse vertical scan, and vertical RDPCM is used in a vertical prediction mode, which again in turn determines this can order as a reverse horizontal scan. In inter-image-encoding, either horizontal or vertical RDPCM may be selected (for example, by the control at 345 in response to calculation of a cost function) and the scan mode is always reverse diagonal.

FIGS. 23a and 23b schematically illustrate trends in RDPCM encoded data arrays. In particular, FIG. 23a relates to horizontal RDPCM encoding, and schematically illustrates the fact that the left-hand column 930 of data are encoded unchanged (and so can have any value), and then remaining data tend to have lower values as they represent only difference quantities. FIG. 23b schematically illustrates the case for vertical RDPCM encoding, in which the uppermost row 940 of data values are encoded unchanged, whereas the remaining data values are represented by differences which would tend to be lower in magnitude.

A significant aspect of the RDPCM data relates to the dependency of encoded data items upon previously encoded data items. In particular, each column of samples in horizontal RDPCM cannot be encoded or decoded without the reconstructed values of the immediately left-hand column, and each row of samples in vertical RDPCM cannot be encoded or decoded without the reconstructed values of the immediately above row of samples. So, while this is not necessarily a limitation on many aspects of the operation of an encoder or a decoder, it is recognised in the present embodiments that this dependency can in fact prevent successful use of the RDOQ system discussed above. Reasons for this will now be described.

RDOQ relies upon a scanning operation through a block of data using the same scan order as that applied by the entropy encoding function. Assuming a conventional reverse scan direction is used, this would imply that the RDOQ process would require access to data values which are not yet available, because each data value has a chain of dependency heading leftwards (in the case of horizontal RDPCM) or upwards (in the case of vertical RDPCM) in the array.

One solution to this problem might appear to be just to reverse the order in which the RDPCM operation is carried out, so that a vertical RDPCM operation starts with the bottom row and works upward, and a horizontal RDPCM operation starts with the right column and works leftward. However, such an arrangement is not considered desirable, particularly in the case of intra-image predicted data, in which the left column and top row of samples are considered the most reliable, in that they represent spatial positions which are closest to the image positions of those reference samples from which the samples are predicted. Accordingly, instead, a change in the entropy encoding order, and in turn to the order of processing of RDOQ, is proposed. This change will be described below.

FIGS. 24a and 24b schematically illustrate changes to a scanning order for vertically encoded RDPCM data in the case of intra-image encoding. In particular, FIG. 24a schematically illustrates a reverse horizontal scan order, in which the numbers 1 . . . 16, in that order, illustrate successive scan positions starting with the bottom right scan position. The scan order of FIG. 24a would normally be applied to a block of data having a vertical prediction direction. However, if RDPCM is used, a forward horizontal scan order as shown in FIG. 24b is used, starting with the top left scan position.

FIGS. 25a and 25b schematically illustrate changes to a scanning order for horizontally encoded RDPCM data. In particular, FIG. 25a schematically illustrates a reverse vertical scan order, in which the numbers 1 . . . 16, in that order, illustrate successive scan positions, again starting with the bottom right scan position. The scan order of FIG. 25a would normally be applied to a block of data having a horizontal prediction direction. However, if RDPCM is used, a forward vertical scan order as shown in FIG. 25b is used, starting with the top left scan position.

Figures 26A, 26B, 27:
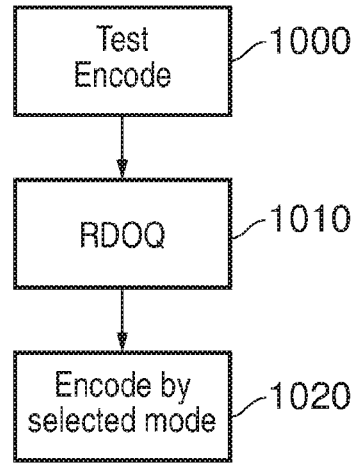
FIGS. 26a and 26b schematically illustrate changes to a scanning order for inter-image encoded RDPCM data.
FIG. 27 is a schematic flowchart illustrating a method of processing.

FIGS. 26a and 26b schematically illustrate changes to a scanning order for inter-image encoded RDPCM data in the case of intra-image encoding. In particular, FIG. 26a schematically illustrates a reverse diagonal scan order, in which the numbers 1 . . . 16, in that order, illustrate successive scan positions starting with the bottom right scan position. The scan order of FIG. 26a would normally be applied to a block of data using inter-image encoding. However, if RDPCM is used, a forward diagonal scan order as shown in FIG. 26b is used, starting with the top left scan position.

A common feature of all of the scan orders is shown in FIGS. 24b, 25b and 26b is that, for any scan position within the forward scan order, the preceding scanned data values (represented by smaller numbers in the scan order) are always available, having already been encoded and decoded by the RDPCM system. In other words, for any RDPCM data value in the processing order, the RDPCM data value does not have a dependency on an RDPCM data value later in the processing order. Accordingly, by using a forward scan order rather than a reverse scan order when RDPCM is used, RDOQ can still be operated even with RDPCM data.

FIG. 27 is a schematic flowchart illustrating a method of processing comprising the steps of test encoding a block of data at a step 1000 including using an RDPCM code and a forward scan order as discussed above, applying an RDOQ process at a step 1010, and, at a step 1020, encoding the block using the encoding regime selected by the RDOQ process. In other words, RDOQ is used with DPCM encoded data (such as RDPCM data, or in alternative embodiments other types of DPCM data can be used, that is to say, in which DPCM is used to encode data other than the residual values). In embodiments, RDOQ may be used for intra-encoded but not for inter-encoded (or intra-block-copy encoded–see below) data. This therefore provides an example of a video data encoding method for encoding an array of input video data values, the method comprising: applying a differential pulse code modulation (DPCM) operation to the array of input video data values to generate an array of DPCM data values; quantising data derived from the DPCM data values; and controlling selection of a rounding operation by the quantiser from two or more candidate rounding operations.

Figure 28:
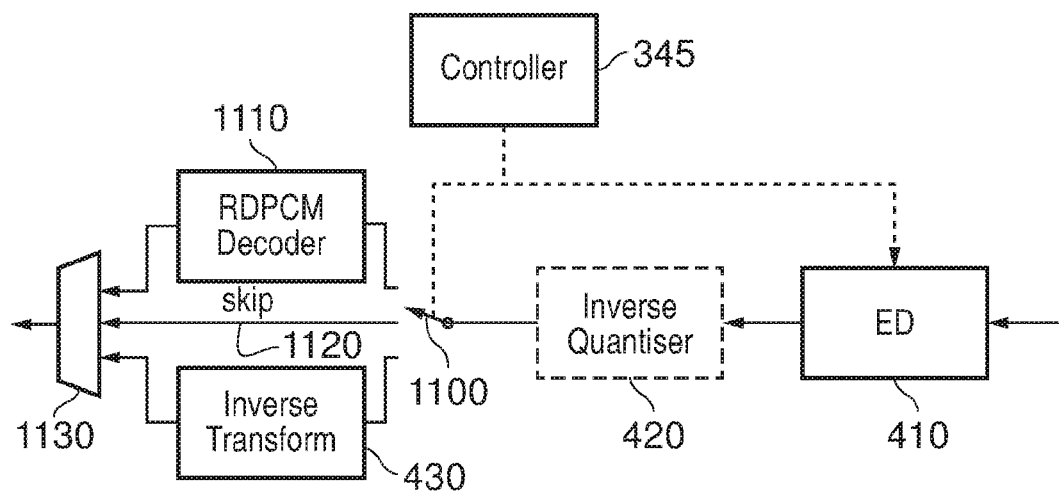
FIG. 28 schematically illustrates part of a decoder.

FIG. 28 schematically illustrates part of a decoder (or the decoding path of an encoder) corresponding to the part of the encoder shown schematically in FIG. 20. The controller 345 determines controls a schematic switch 1100 so as to route data to an RDPCM decoder 1110, to a bypass route 1120 or to the inverse transform unit 430. Data resulting from any of these routes is forwarded for further processing by a multiplexer 1130.

The inverse quantiser 420 is shown in a dotted line, because it may be omitted from the processing chain (under the control of the controller 345) in a trans-quant bypass mode.

Note that in FIGS. 20 and 28, the control operations apply not only to the switches 910, 1100 but also to the entropy encoder and decoder operations. This is because when an RDPCM mode is selected, the scan order used by entropy encoding and decoding is a forward scan order opposite to the usual reverse scan order.

The techniques described above relate to a relationship between the entropy encoding (and decoding) scan order and the use of RDPCM encoding. The techniques are applicable to RDPCM modes including (without limitation) so-called transform skip modes and trans-quant bypass (omitting frequency transformation and quantisation) modes.

In some examples, an operation referred to as "rotation" or re-ordering may be used in the encoding and decoding processes.

Rotation refers to an operation whereby data values in a square array of data values are rotated by 180° around the geometric centre of that array. So, for example, in the case of a 4×4 array of the type discussed above, having a numbering scheme from number 1 in the top-left corner, progressing left to right along each row in turn down to 16 in the bottom-right corner, the axis of the 180° rotation would be at the geometric centre of the array, which is to say the junction between the array elements initially numbered 6, 7, 10 and 11. A 180° rotation will exchange each array data value with another array data value rotationally displaced from that array element by 180°. For example, the array data values numbered 1 and 16 are interchanged; those numbered 2 and 15 are interchanged; and so on. It will therefore be appreciated that the rotation operation is both lossless and entirely reversible.

Rotation has been proposed for use in some previously proposed encoders and decoders. (Note that if rotation is used at the encoder side, it also has to be used at the decoder side and in the decoder path of the encoder; if rotation is not used at the encoder side, it should not be used either at the decoder side or in the decoder path of the encoder). In particular, rotation may be selected for use in respect of transform-skip blocks. A reason why rotation is available (though not compulsory) for use with transform-skip blocks in some previously proposed systems is as follows. The entropy encoding process is arranged to scan "backwards", which is to say that entropy encoding operates from the lower right region of a block towards the upper left region of a block. This is based on the principle that entropy encoding operates potentially more efficiently if it starts with smaller data values and progresses towards larger data values within a block. However, in a transform-skip mode, it is the residual data which is being encoded by the entropy encoding process. Generally speaking, when using intra-prediction, the residual data values are smaller in magnitude (representing a better or closer prediction of the corresponding pixel) at block positions which are closest in image position to the reference samples from which the prediction is made. In an intra-image encoded block, the reference samples are located down the left side and along the top of the block to be predicted. So, in transform-skip processing of intra-image encoded blocks, the residual values are likely to be of smaller magnitude towards the upper left of the block and of larger magnitude towards the lower right of the block. For this reason, it may be advantageous to use the rotation arrangement in respect of such transform-skip intra-image encoded blocks so that the entropy encoding process operates on the smaller magnitude values first. Rotation can be selected, for example by a controller such as the controller 345, for example in response to testing the number of bits and the bit error rate generated with and without the rotation step included in the process.

Where a frequency transformer is used, embodiments are operable in a first mode (such as transform-skip) in which RDPCM coding is used, and in a second mode in which the frequency transformer is operable to apply a frequency transformation instead of the RDPCM coder applying an RDPCM operation.

If rotation is selected, its use can be flagged in the output data stream such that a decoder may select rotation response to detection of such a flag.

In previously proposed systems, rotation is not obligatory and the selection of rotation within the encoding and decoding path is entirely separate from any decision at the encoder to use RDPCM. In these previously proposed systems, rotation is used only for intra-image encoded 4×4 blocks. For bigger blocks than this, rotation is not used.

Variations upon the use of rotation and other features, relating to embodiments of the present technology, will now be discussed. These are initially summarised in FIGS. 29-31, which are schematic flowcharts indicating aspects of the operation of an encoder and/or decoder, and then will be discussed in more detail below.

Figures 29, 30, 31:
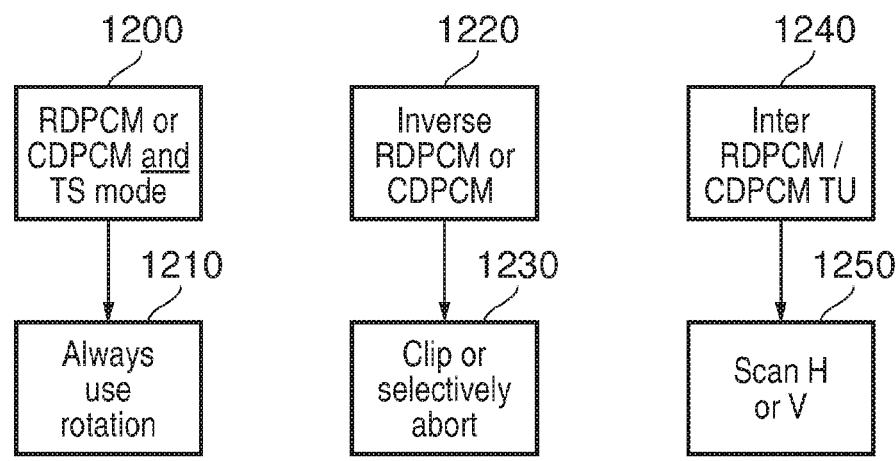
FIGS. 29-31 are schematic flowcharts indicating aspects of the operation of an encoder and/or decoder.

FIG. 29 relates to circumstances in which rotation is applied. If, at a schematic step 1200, RDPCM or CDPCM (coefficient differential pulse code modulation-see below) is in use in respect of a transform-skip block, then at a step 1210 rotation is always used. Note that this contrasts with previously proposed arrangements in which (a) the use of rotation is entirely optional, and (b) the selection of rotation is independent of the selection of a DPCM mode. Note that RDPCM and CDPCM arrangements are examples of DPCM arrangements.

FIG. 30 relates to an aspect of an inverse RDPCM or CDPCM operation, which is to say an operation carried out at a decoder or in a decoding path of an encoder. Where such an operation is used (indicated by a schematic step 1220), a clipping operation is also performed at a schematic step 1230 so as to clip the output data from the inverse RDPCM or CDPCM operation to a numerical range (for example, a number of bits) representing the appropriate or acceptable range of valid data generated by the operation 1220, or selectively abort the RDPCM decoding operation if (for example) one or more of the output RDPCM data values is outside the acceptable numerical range. The number of bits applicable to embodiments of the present disclosure will be discussed below.

In some embodiments, rather than clipping the output data from the inverse RDPCM operation, the inverse RDPCM operation can be aborted if one or more of the RDPCM decoded data values is outside an acceptable numerical range for such data. For example, this feature may be applied on a block-by-block (array by array) basis, for example on a TU by TU basis, such that if any one decoded RDPCM value is outside the acceptable numerical range for such data, then the inverse RDPCM operation for that block is aborted and zeroes, other predetermined values or error codes are inserted in place of the decoded data. Decoding can resume for the next block, as the RDPCM/inverse RDPCM operation is independent as between one block and another block. In other embodiments, the aborting operation could be applied if at least a threshold number (for example, 2) decoded data values are outside the acceptable range. The threshold value could vary (according to a predetermined look-up table, for example) in dependence upon the size of the block.

Aborting the operation in this context can mean (for example) one or more of: halting operation of the decoding function, outputting an error message, discarding decoded values for TUs, coding units, image slices, image regions or images in which such an error (that is to say, the decoded RDPCM data exceeding an acceptable numerical range) has occurred, or any other representation (such as those described above) of the fact that a problem with the data has led to an attempt to decode data outside of an acceptable numerical range.

The acceptable numerical range can be defined in the data stream or, in some embodiments, according to a predetermined relationship with one or more of: block size and bit depth of the video data and/or the internal processing.

FIG. 31 relates to a scan order (at the entropy encoding and decoding stage) applicable to inter-image encoded RDPCM or CDPCM TUs. In previously proposed arrangements, inter-image encoded TUs are subject to entropy encoding according to a reverse diagonal scan order. However, in embodiments of the present technology, if (at a schematic step 1240) an inter-image encoded RDPCM or CDPCM TU is being processed, then at a schematic step 1250 a horizontal or vertical scan mode is used at the entropy encoding and decoding stage. Further details of the appropriate scan mode will be discussed below.

If rotation is introduced into an encoder or decoder, the outcomes according to previously proposed arrangements are shown in FIGS. 32 and 33. These will now be described in order to illustrate potential problems with these arrangements. Where parts or features of these diagrams correspond to identity numbered parts of previously described diagrams, those parts or features will not be described in detail again.

FIG. 32 schematically indicates a part of a previously proposed encoder and/or decoder operating in respect of intra-image encoded blocks. As mentioned, in many respects this arrangement is similar to that shown in FIG. 5. An RDPCM encoder 1300 supplies encoded data to a rotation (reordering) unit 1310. Here, the rotation operation (1310) is carried out in respect of 4×4 transform-skip and trans-quant bypass TUs. The transform 340 and quantisation 350 units are shown, but one or both of these would be expected to be bypassed in either a transform-skip mode (in which the transform unit 340 is not used) or a trans-quant bypass mode in which neither unit is used. A single unit (labelled as 360, 370, 400, 410) indicates the operation of scanning and entropy encoding and decoding. Optional inverse quantisation inverse transform units are shown, and data is then passed to an inverse rotation unit 1320 which restores the original order as an inverse operation to that provided by the rotation unit 1310. Finally, an inverse RDPCM unit (decoder) 1330 carries out the inverse operation to the RDPCM encoder 1300. Note that as discussed above, the RDPCM encoder 1300 requires the decoded residual values from the decoder 1330 in order to encode the difference values.

FIG. 33 schematically indicates a part of a previously proposed encoder and/or decoder operating in respect of inter-image encoded blocks. Here, once again the rotation operation (1310) is carried out in respect of 4×4 transform-skip and trans-quant bypass TUs. Otherwise, the units operate in a similar manner but the ordering is slightly different in comparison to FIG. 32.

There are a number of perceived problems with these previously proposed arrangements.

A first problem relates to the use of different configurations for inter- and intra-image encoded blocks. Perceived advantages of this previously proposed arrangement are that the inter-image encoding path benefits from the increased accuracy of the different ordering. It also benefits from a shortened encoder feedback path. However, the differences between the inter and intra paths are unwelcome: the use of rotation prior to the encoder's inter-RDPCM is peculiar. Indeed, rather than an RDPCM process (operating on the residual samples), in effect, the inter-encoding path should be considered to be a "coefficient DPCM" (CDPCM) process (even though a transform is not used) because it is applied after the transform-skip in the encoder.

A second problem relates to an inability to apply RDOQ. The rate-distortion-optimised quantisation (RDOQ) algorithm, as discussed above, cannot be applied to the inter-image encoded case in this previously proposed arrangement—the differential coding is applied in forward scan order, whereas the entropy coder (which RDOQ models), will process the coefficients in reverse scan order. RDOQ can actually be used for the intra case, but only if rotation is used (and then therefore only for 4×4 transform-skip TUs).

A third problem relates to numerical limits of the inverse DPCM process, in either inter- or intra-image encoding. The bit-stream is restricted in that it may not contain values that are more than 'MTDR+1' signed bits (typically 16-bits) in size. MTDR is short for a system variable representing the maximum dynamic range of the transform process, but in this context it represents the magnitude of an appropriate or allowable numerical range for the data. The only other clipping is at the output of the inverse quantiser (again, which clips to 'MTDR+1' signed bits for non-transquant-bypass TUs) and when the reconstruction value is formed. In the intra-encoding configuration of FIG. 32, this means that the inputs of the inverse RDPCM could be 'MTDR+1' signed bits in size, even though in reality the values should be of the order of residual coefficients, or 'n+1' signed bits in size. In addition, the inverse RDPCM module utilises an accumulator, and therefore theoretically, the number of bits in the output (and accumulator) could be as much as the bit depth of the input RDPCM data+$\log_2$ (size) bits (where "size" represents a linear dimension of the block size, in samples (so a 4×4 block would have a size of 4). For 32×32 TUs, this can be 5 bits more than the input, which could be as much as 21 bits (signed).

A fourth problem relates to restrictions on parallelisation. When the so-called sample adaptive intra-prediction technique was originally proposed as a tool in the HEVC system, parallelisation was straightforward as the process was only applied to lossless blocks. An encoder could easily generate differences between the source residual data; a decoder could easily generate accumulations, either column-by-column or row-by-row, contrary to the direction of RDPCM. i.e. for a horizontal RDPCM, the data could be processed column by column. Note, however, that the block could not start to be decoded until the top-left coefficient was decoded, which since the order is reverse-scan, is decoded last. Hence a buffer to temporarily hold the TU is required. But for the RDPCM system shown in FIG. 32, the amount of parallelisation which can be implemented is limited. Again, an encoder can, for a horizontal RDPCM arrangement, process the data column by column. However, as before, a decoder must wait until the top-left coefficient was decoded; for non 4×4 blocks or when rotation is disabled this will be the last in the TU. In addition, for inter-processing, the scan order is always diagonal, and therefore coefficients will not be decoded in the appropriate order. For 4×4 intra-encoded blocks with rotation, the coefficients are decoded by the entropy decoder in an appropriate order—for horizontal RDPCM, the coefficients are decoded column by column because the intra prediction direction that indicates the use of horizontal RDPCM also indicates the use of the vertical scan order. The combination with rotation means that the first set of values decoded is actually the first column, and therefore RDPCM can be processed column-by-column without delay.

Figure 34:
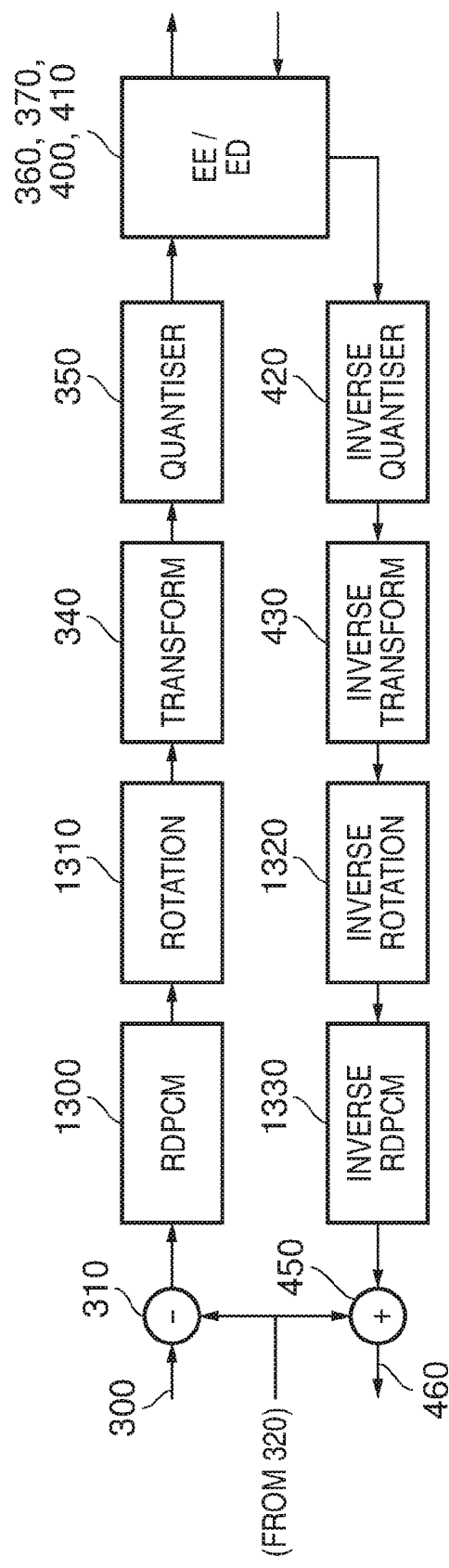
FIG. 34 schematically indicates a part of an encoder and/or decoder operating in respect of intra-image encoded blocks.
Figure 35:
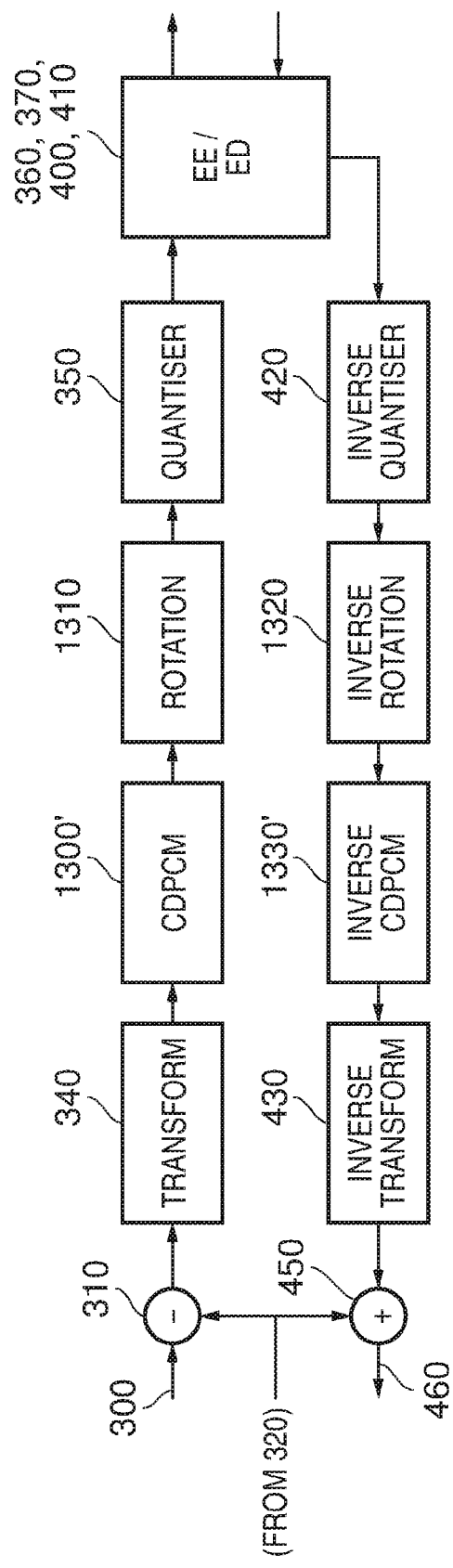
FIG. 35 schematically indicates a part of an encoder and/or decoder operating in respect of inter-image encoded blocks.

These problems may be alleviated by the use of the so-called unified arrangements of FIGS. 34 and 35, incorporating one or more of the techniques discussed above with reference to FIGS. 29-31. Again, where blocks or features correspond to those discussed earlier, they will not be discussed in detail again.

In some embodiments, RDOQ may be used with at least intra-encoded data (representing the use of RDOQ in respect of data encoded using a subset of a group of encoding modes (the group being intra, inter, and intra-block copy encoding, for example) but not in respect of encoding modes in the group which are not in the subset) and, optionally, with inter-encoded data. In embodiments, rotation is or may be used in the arrangements which employ RDOQ. In some embodiments, rotation is enabled for intra-encoded data but not for inter-encoded data. Accordingly, the arrangements that are described below can provide examples of video data encoding apparatus operable to encode an array of input video data values, the apparatus comprising: a differential pulse code modulation (DPCM) coder configured to apply a differential pulse code modulation operation to the array of input video data values to generate an array of DPCM data values; a quantiser operable to quantise data derived from the DPCM data values; and a controller for controlling selection of a rounding operation by the quantiser from two or more candidate rounding operations. The controller may be a rate-distortion-optimised quantisation controller. As discussed above, rotation may also be used, in which case this provides an example of the use of a data reordering unit configured to apply a reordering operation to an array of data input to or output from the DPCM coder. The reordering operation may be, for example, a rotation operation in which data values in the array of data are rotated in position about a point in the array. The controller may be operable in respect of intra-image encoded video data values but may be disabled in respect inter-image encoded data values.

In some embodiments, a so-called intra-block-copy (IBC) encoding is or may be used. This represents a hybrid of inter- and intra-encoding, such that a block is generated by copying another block from another position within the same image, according to a displacement which may be considered to be similar in some respects to a motion vector. In some embodiments, the IBC mode is handled in the same way as inter-image encoding, from the point of view of whether rotation and RDOQ are used. In other words, in some embodiments, rotation is disabled for IBC blocks. Accordingly, RDOQ and rotation may be used with DPCM in some embodiments which employ a subset of an available group of prediction types, with one example of the subset being intra-image encoding (the remaining non-subset members of the group could be, for example, inter-image encoding and/or intra-block-copy encoding).

FIG. 34 schematically indicates a part of an encoder and/or decoder operating in respect of intra-image encoded blocks.

This arrangement aims to unify the inter and intra cases, to always give an encoder the option to apply RDOQ for the transform-skip case and to improve the processing order of coefficients to increase parallelisation and reduce buffer usage. This can be achieved in one of two ways (as examples), as described in respect of FIGS. 34 and 35. Accordingly, the arrangements shown in FIGS. 34 and 35 may each use RDOQ as well as DPCM in respect of at least some encoding modes.

In these configurations, always applying rotation after the DPCM module allows RDOQ to be used—the order the coefficients are encoded in is now effectively from the top left down to the bottom right (either horizontal, vertical or diagonal scan), which is an order in which RDPCM can produce coefficients.

This therefore provides an example of a video data encoding apparatus (and a corresponding method) operable to encode an array of input video data values, the apparatus comprising: a differential pulse code modulation (DPCM) coder such as the coder 1300 or 1300' configured to apply a differential pulse code modulation operation to the array of input video data values such as the residual data provided to the apparatus of FIG. 34 to generate an array of DPCM data values; a quantiser such as the quantiser 350 operable to quantise data derived from the DPCM data values; and a controller (for example, being implemented by the quantiser 350 and/or the controller 345) for controlling selection of a rounding operation by the quantiser from two or more candidate rounding operations, which is to say, purely by way of example, operating in an RDOQ mode. Accordingly such an arrangement provides an encoding arrangement in which RDOQ is used with DPCM encoding, and indeed features of embodiments of the disclosure facilitate the encoder being able to select RDOQ in such circumstances. A reordering operation such as a rotation operation (for example a rotation operation in which data values in the array of data are rotated in position about a point in the array) to an array of data input to or output from the DPCM coder may be used as discussed above. These techniques may be combined with other techniques described here.

In addition, to simplify the processing of inter-RDPCM coefficients, the encoding of inter RDPCM coefficients is no longer forced to use diagonal scan, but instead uses vertical scanning for horizontal inter RDPCM, and horizontal scanning for vertical inter RPCDM (similar to the intra behaviour).

Also, to prevent the accumulators in the inverse RDPCM module being excessively large, a clipping operation is used.

RDPCM is applied to the residual if required, then the TU is rotated if RDPCM was applied, or if an SPS flag indicates that such transform-skipped/transquant-bypass TUs should be rotated (SPS is used in previously proposed systems as a flag indicating whether rotation should be applied; in the previously proposed systems rotation is available only to 4×4 transform-skip or trans-quant bypass TUs). Following this, the TU is transformed (or the transform is bypassed in a transform-skip mode) and quantised. Clipping can be applied (according to the step 1230 discussed above) during the accumulation of RDPCM values in the inverse RDPCM module, limiting the accumulator and downstream values (the output of the inverse RDPCM module) to just n+1 signed bits. Note that rotation could be applied after the quantiser, or can even be considered as a change to the scan order in the entropy coder, effectively scanning in forward order rather than reverse.

Accordingly, FIG. 34 provides an example of video data encoding apparatus (and a corresponding method) operable to encode an array of input video data values, the apparatus comprising a residual differential pulse code modulation (RDPCM) coder configured to apply a differential pulse code modulation operation to the array of input video data values to generate an array of RDPCM data values; and an entropy encoder operable to entropy-encode the RDPCM data in a processing order, with respect to the array of RDPCM data values, such that, for any RDPCM data value in the processing order, the RDPCM data value does not have a dependency on an RDPCM data value later in the processing order. These techniques are applicable to inter-encoded data, in which: the array of input video data values comprises an array of residual values generated as differences between respective video samples of a current image and predicted versions of those video samples, the predicted versions being derived from one or more images other than the current image; and for any such array of input video data values, the processing order is always such that, for any RDPCM data value in the processing order, the RDPCM data value does not have a dependency on an RDPCM data value later in the processing order. The techniques are also applicable to intra-encoded data in which the array of input video data values comprises an array of residual values generated as differences between respective video samples of a current image and predicted versions of those video samples, the predicted versions being derived from the current image; and for any such array of input video data values, the processing order is always such that, for any RDPCM data value in the processing order, the RDPCM data value does not have a dependency on an RDPCM data value later in the processing order. In intra-encoded data the predicted versions are derived from one or more reference pixels from reference regions adjacent to the image position of the respective video samples. In an alternative, sometimes referred to as intra block copy, the predicted versions are derived from one or more reference pixels from reference regions (in the current image) defined with respect to the image position of the respective video samples by one or more motion vectors.

FIG. 35 schematically indicates a part of an encoder and/or decoder operating in respect of inter-image encoded blocks, in the case that a transform is applied first. Accordingly, the operation is referred to as CDPCM rather than RDPCM, but the principles remain the same. In particular, techniques discussed in the present application in connection with RDPCM may be used in connection with CDPCM, and indeed references to RDPCM and CDPCM should be considered as interchangeable examples of DPCM systems—the difference lies not in technical features of the two techniques, but simply in terms of the position within the processing order at which the RDPCM operation is applied.

The TU is first transformed (or transform-skip is applied), then CDPCM is applied by a CDPCM encoder 1300' (if required), then the TU is rotated (again only if CDPCM was applied, or if a SPS flag indicates that such transform-skipped/transquant-bypass TUs should be rotated), and quantised. Again, clipping can be applied during the accumulation of CDPCM values in the inverse CDPCM module 1330', limiting the accumulator and downstream values to just MTDR+1 signed bits. Note that rotation could be applied after the quantiser, or can even be considered as a change to the scan order in the entropy coder, effectively scanning in forward order rather than reverse.

In certain limited circumstances, in some of the above arrangements, applying the rotation process after a DPCM process can lead to potential difficulties. An example of such circumstances is where a block is generally plain, which is to say that the block comprises values which are similar to one another (noting that in RDPCM the values are those of residual data as discussed above). Another way of expressing this "plainness" in a block is to say that the block comprises generally DC values. Here, this term indicates that while there may be some variation within the block, most of the content of the block can be represented by a single value (corresponding to a DC coefficient if a frequency transformation were used), with only minor and low spatial frequency variations around that DC value.

Figures 36, 37A, 37B, 38A, 38B:
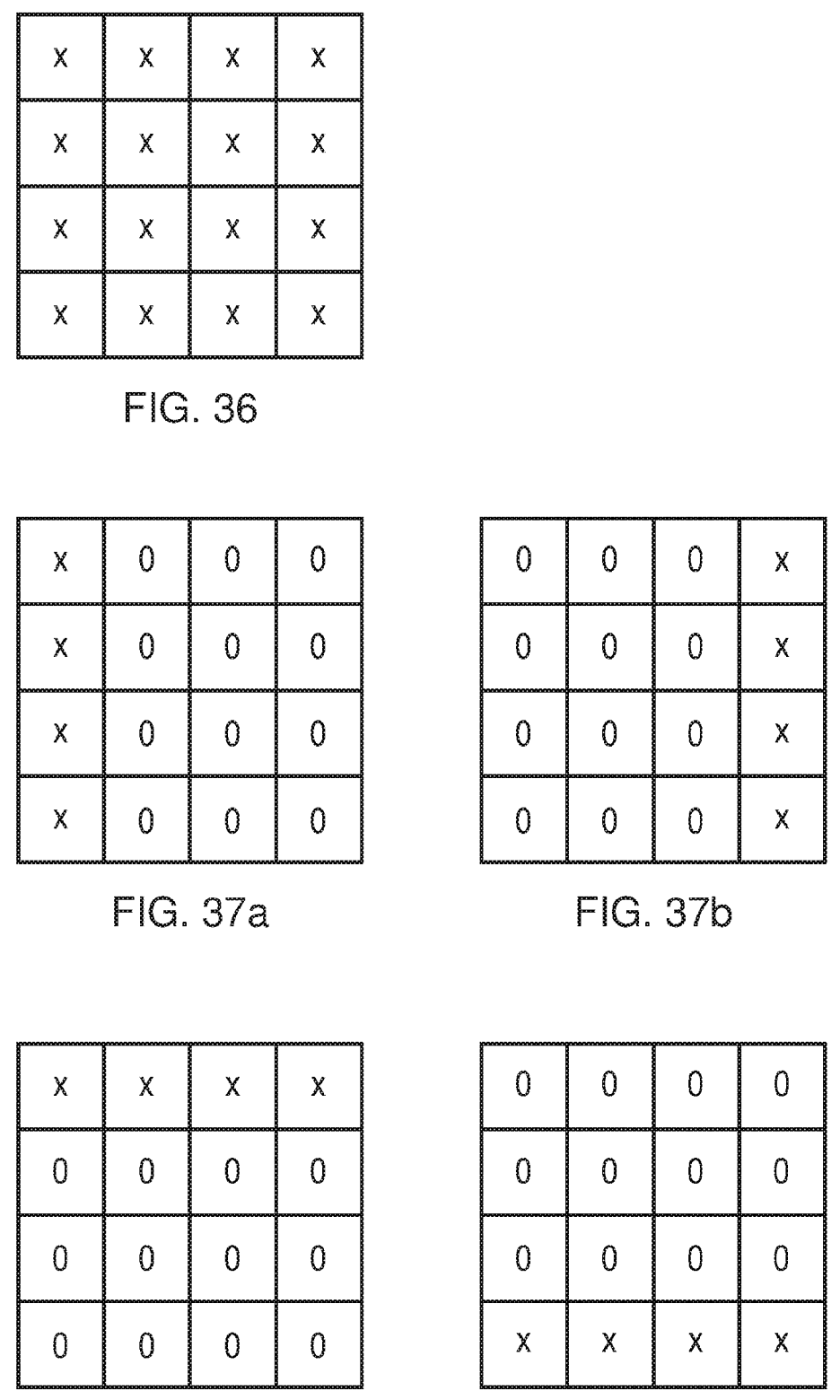

FIG. 36 schematically illustrates such a block of dc values. In fact, in FIG. 36, all of the values are the same (the value x). Having entirely identical values in a hypothetical block is useful for the present discussion, but it will be appreciated that similar properties apply to sets of values within a block which are similar to one another.

FIG. 37a schematically illustrates the block of FIG. 36 after a horizontal DPCM process. As discussed above, for each row of values, the first value is transmitted and then the remaining values are represented by the difference between that value and a reconstructed version of the preceding value. This gives rise to the pattern of x and 0 shown in FIG. 37a. Note that if the original values of the block in FIG. 36 were not identical, a similar pattern to that shown in FIG. 37a would be obtained, but instead of zero, small numbers would be present in those block positions.

FIG. 37b schematically illustrates the block of FIG. 37a after a rotation operation. Undesirably, the non-zero values (x) have been rotated to the far-right column in the block. This is not an appropriate outcome from the point of view of entropy encoding which, as discussed above, is more efficient if the higher value data to be encoded is found towards the top left of a block. If the block had not been rotated, this condition would have been met, but with the rotation operation being performed after the DPCM operation, this condition is broken.

FIG. 38a schematically illustrates the block of FIG. 36 after a vertical DPCM process. The outcome is similar to that shown in FIG. 37a, except that in this case the coding takes place down each column starting from the top so that the non-zero values x are found within a top row of the block of FIG. 38a.

FIG. 38b schematically illustrates the block of FIG. 38a after a rotation operation. Once again, the rotation operation has moved the non-zero values towards a lower right portion of the block, which is a bad outcome from the point of view of the efficiency of the entropy encoding process to follow.

Note that the type of encoding which is often suited to encoding plain blocks of this type is so-called intra-block-copy encoding. This represents a hybrid of inter- and intra-encoding, such that a block is generated by copying another block from another position within the same image, according to a displacement which may be considered to be similar in some respects to a motion vector.

Note also that the rotation operation discussed previously is under the control of a rotation flag. The rotation flag either enables or disables rotation for all transform skip (TS) and trans-quant bypass (TQB) blocks, independently of whether DPCM is used, and independently of whether the block is inter- or intra-block-copy encoded.

Various options will now be discussed to alleviate this problem.

One possibility is to change the nature of the rotation flag such that multiple flags are provided to indicate whether rotation is enabled or disabled in various different encoding modes. One example of a set of flags is indicated schematically in the following table:

| Flag - state = 0 indicates (say) "don't use rotation for this class of blocks"; state = 1 indicates "do use rotation for this class of blocks" | inter/intra/Intra-Block-Copy (IBC) | DPCM | TS or TQB |
| --- | --- | --- | --- |
| Flag 1 | inter | on | TS |
| Flag 2 | inter | on | TQB |
| Flag 3 | inter | off | TS |
| Flag 4 | inter | off | TQB |
| Flag 5 | intra | on | TS |
| Flag 6 | intra | on | TQB |
| Flag 7 | intra | off | TS |
| Flag 8 | intra | off | TQB |
| Flag 9 | IBC | on | TS |
| Flag 10 | IBC | on | TQB |
| Flag 11 | IBC | off | TS |
| Flag 12 | IBC | off | TQB |

It will be appreciated that the order of the flags, and the question of whether a particular polarity indicates that rotation is enabled or disabled, are details which are not important to the underlying technology.

The flags may be transmitted, for example, in the sequence-level parameter set (SPS), or in other embodiments in a picture-level parameter set (PPS), a slice header, a coding unit header or a processing unit header.

The effect of the flags is to set a group of parameters for which rotation is enabled, and a group of parameters for which rotation is not enabled. Then, for a particular TU, the controller 345 can compare the actual parameters relating to that TU with the parameters set by the flags, in order to make a determination as to whether rotation should be used in respect of that TU. A similar operation takes place at the decoder and the encoder. Note that an encoder side, the actual flags might not be generated until an output datastream is assembled, but all the same the parameters which those flags will be based are used in the decision process as to whether rotation should be used.

Figures 39, 40:
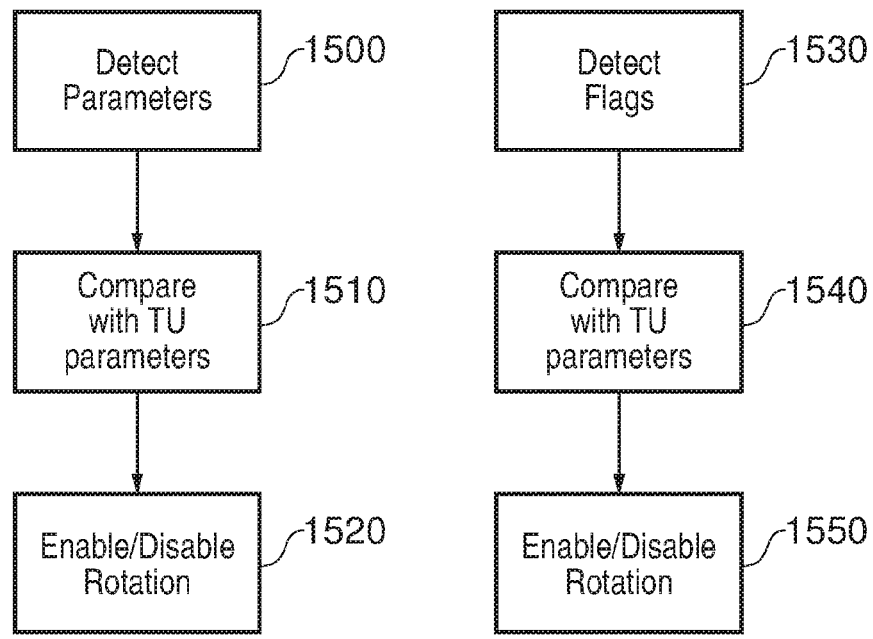
FIG. 39 schematically illustrates a part of the operation of an encoder.
FIG. 40 schematically illustrates a part of the operation of a decoder.

FIG. 39 schematically illustrates a part of the operation of an encoder. At a step 1500, the controller 345 detects (or indeed sets) the set of parameters on which the flags in the above table will be based. In respect of a particular TU, at a step 1510 the controller 345 compares the set of parameters with parameters of that TU, in order to arrive at a decision (in a step 1520) to enable or to disable rotation in respect of that TU.

FIG. 40 schematically illustrates a part of the operation of a decoder. At a step 1530, the controller 345 detects the set of flags, for example from the input datastream. In respect of a particular TU, at a step 1540 the controller 345 compares the parameters represented by the flags with parameters of that particular TU, in order to arrive at a decision (in a step 1550) to enable or to disable rotation in respect of that TU.

Note that not all of the flags need to be used; a subset may be employed. For example, flags 5-8 control rotation for intra encoding, and could form a subset of flags for use in a particular embodiment. Another example of a subset might be flags 7 and 8 which control rotation for intra encoding when DPCM is not used. Accordingly, some example subsets of flags include:

Flags 1-4;
Flags 3-4;
Flags 5-8;
Flags 7-8;
Flags 9-12;
Flags 11-12.

Also, default values may be assumed in some respects. For example, certain ones of the flags may be specifically controlled, which would lead to the inference that other flags are set in a particular way (according to predetermined parameters). For example, if the combination of flags 7 and 8 is signalled in the SPS, then the other flags could be inferred to be either 0 or 1 according to a predetermined set of rules.

Note also that multiple ones of these flags may be represented by a single more complex flag than the current rotation flag. For example, a single "rotation" Flag could take into account more than one of the above flags' meanings. An example of a single flag (or one of a small subset of flags) could indicate "use rotation for all TS/TQB blocks in which DPCM is used, apart from IBC blocks".

These are all examples of associating (or, at the decoder, detecting) two or more flags with the encoded data, the two or more flags defining whether or not the data reordering operation should be applied in respect of two or more respective permutations of encoding (decoding) parameters. In embodiments, the encoding parameters may include some or all of:

whether an inter-image, intra-image or intra-block-copy mode is used;
whether an RDPCM operation is used; and
whether a transform skip or trans-quant bypass mode is used.

Another option, which may be used in combination with or instead of the above techniques, is to employ a flag which changes the position of the rotation operation within the processing order.

Figure 41A:
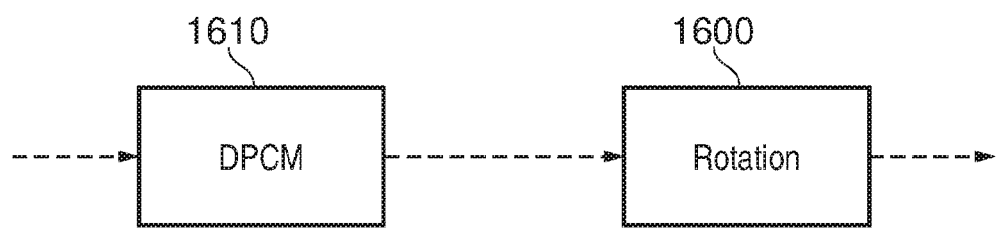
FIGS. 41a and 41b schematically illustrate variations in processing order.
Figure 41B:
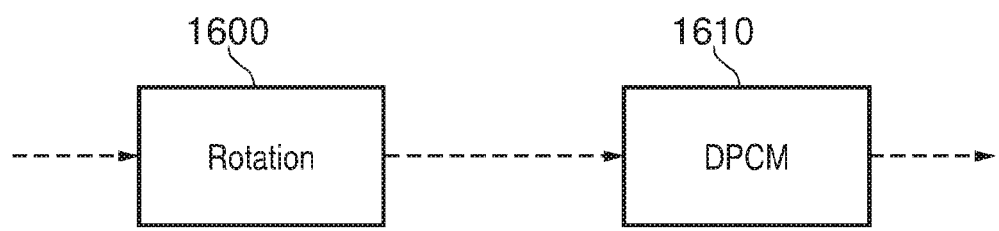

FIGS. 41a and 41b schematically illustrate variations in processing order. These relate to arrangements discussed above in respect of FIGS. 32-35, and deliberately show only two aspects of the processing operation, namely a rotation process 1600 and a generic DPCM process 1610. In some embodiments, as discussed above, these modes are used together (with RDOQ) in respect of intra-encoded blocks but not in respect of inter-encoded or intra-block-copy blocks. These processes are linked by dashed lines indicating that (potentially at least) other processes may precede or follow them, and other processes may be disposed between the two. The two options are predetermined at the encoder and the decoder. In FIG. 41a, the DPCM process precedes the rotation process. In FIG. 41b, the DPCM process follows the rotation process. A single flag may be employed to signal, as between the encoder and the decoder, which of these two options should be used:

| | |
|---|---|
| Flag = 0 | Rotation precedes DPCM |
| Flag = 1 | Rotation follows DPCM |

The decision as to which of these flags to use, and how to set the larger group of flags discussed in the previous table, can be made by the controller 345 according to the results of trial encodings and/or according to predetermined rules established at the encoder and/or according to user settings. This is an example of associating (or, at the decoder, detecting) a flag with the encoded data indicating whether the data reordering operation is applied to data which has been subject to RDPCM encoding or to data to be RDPCM encoded.

Data Signals

It will be appreciated that data signals generated by the variants of coding apparatus discussed above, and storage or transmission media carrying such signals, are considered to represent embodiments of the present disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

All of the techniques described above have application in encoding apparatus and methods, and/or in decoding apparatus and methods. Techniques discussed In relation to encoding have corresponding features on the decoding side. Techniques discussed in relation to decoding have application in the decoding path of the encoder. Accordingly, it will be appreciated that the description above of encoding techniques and apparatus, which techniques and apparatus include a decoding path, are also relevant as examples of decoding techniques and apparatus.

Respective features and/or embodiments of the present disclosure are defined by the following numbered clauses:

1. Video data encoding apparatus operable to encode an array of input video data values, the apparatus comprising:
   a residual differential pulse code modulation (RDPCM) coder configured to apply a differential pulse code modulation operation to the array of input video data values to generate an array of RDPCM data values; and an entropy encoder operable to entropy-encode the RDPCM data in a processing order, with respect to the array of RDPCM data values, such that, for any RDPCM data value in the processing order, the RDPCM data value does not have a dependency on an RDPCM data value later in the processing order.

2. Apparatus according to clause 1, in which:
   the array of input video data values comprises an array of residual values generated as differences between respective video samples of a current image and predicted versions of those video samples, the predicted versions being derived from one or more images other than the current image; and for any such array of input video data values, the processing order is always such that, for any RDPCM data value in the processing order, the RDPCM data value does not have a dependency on an RDPCM data value later in the processing order.

3. Apparatus according to clause 1 or 2, in which:
   the array of input video data values comprises an array of residual values generated as differences between respective video samples of a current image and predicted versions of those video samples, the predicted versions being derived from the current image; and for any such array of input video data values, the processing order is always such that, for any RDPCM data value in the processing order, the RDPCM data value does not have a dependency on an RDPCM data value later in the processing order.

4. Apparatus according to clause 3, in which the predicted versions are derived from one or more reference pixels from reference regions adjacent to the image position of the respective video samples.

5. Apparatus according to clause 3, in which the predicted versions are derived from one or more reference pixels from reference regions defined with respect to the image position of the respective video samples by one or more motion vectors.

6. Apparatus according to any one of the preceding clauses, comprising a frequency transformer, the apparatus being operable in a first mode in which RDPCM coding is used, and in a second mode in which the frequency transformer is operable to apply a frequency transformation instead of the RDPCM coder applying an RDPCM operation.

7. Apparatus according to clause 6, in which:
   the frequency transformer is operable in the second mode to generate an array of frequency transformed data; and
   the entropy encoder is operable in the second mode to apply a processing order starting from an array position corresponding to that of a highest frequency component and ending at an array position corresponding to that of a lowest frequency component.

8. Apparatus according to clause 7, comprising a data reordering unit configured to apply a reordering operation to an array of data.

9. Apparatus according to clause 8, in which the data reordering operation is a rotation operation in which data values within a block are rotated by 180° about a centre of the block.

10. Apparatus according to clause 8 or clause 9, in which:
    the first mode is a transform-skip mode in which a frequency transformation is not used; and
    the data reordering unit is configured so as always to operate on the RDPCM coded data in the transform-skip mode.

11. Apparatus according to clause 8 or clause 9, the apparatus being operable to associate two or more flags with the encoded data, the two or more flags defining whether or not the data reordering operation should be applied in respect of two or more respective permutations of encoding parameters.

12. Apparatus according to clause 11, in which the encoding parameters include some or all of:
    whether an inter-image, intra-image or intra-block-copy mode is used;
    whether an RDPCM operation is used; and
    whether a transform skip or trans-quant bypass mode is used.

13. Apparatus according to clause 12, in which the encoding parameters include all of:

whether an inter-image, intra-image or intra-block-copy mode is used;
whether an RDPCM operation is used; and
whether a transform skip or trans-quant bypass mode is used.

14. Apparatus according to any one of clauses 8 to 13, the apparatus being operable to associate a flag with the encoded data indicating whether the data reordering operation is applied to data which has been subject to RDPCM encoding or to data to be RDPCM encoded.

15. Apparatus according to any one of the preceding clauses, in which, for RDPCM data, the processing order is a horizontally scanned or a vertically scanned processing order.

16. Apparatus according to any one of the preceding clauses, the apparatus comprising, in a decoding path, a residual differential pulse code modulation (RDPCM) decoder configured to apply a differential pulse code modulation operation to the entropy decoded video data values to generate an array of RDPCM data values.

17. Apparatus according to clause 16, in which the RDPCM decoder is operable to clip the RDPCM decoded data to an acceptable numerical range for such data.

18. Apparatus according to clause 16, in which the RDPCM decoder is operable to abort the decoding of the entropy decoded video data values if one or more of the RDPCM decoded data values exceeds an acceptable numerical range for such data.

19. Video data encoding apparatus operable to encode an array of inter-image encoded input video data values, the apparatus comprising:
a residual differential pulse code modulation (RDPCM) coder configured to apply a differential pulse code modulation operation to the array of input video data values to generate an array of RDPCM data values; and
an entropy encoder operable to entropy-encode the RDPCM data in a processing order, with respect to the array of RDPCM data values, the processing order being a horizontally scanned or a vertically scanned processing order.

20. Video data encoding apparatus operable to encode an array of input encoded video data values, the apparatus comprising, in a decoding path, a residual differential pulse code modulation (RDPCM) decoder configured to apply a differential pulse code modulation operation to the entropy decoded video data values to generate an array of RDPCM data values, the RDPCM decoder being operable to clip the RDPCM decoded data to an acceptable numerical range for such data.

21. Video data encoding apparatus operable to encode an array of input encoded video data values, the apparatus comprising, in a decoding path, a residual differential pulse code modulation (RDPCM) decoder configured to apply a differential pulse code modulation operation to the entropy decoded video data values to generate an array of RDPCM data values, the RDPCM decoder being operable to abort the decoding of the array of input encoded data values if one or more of the RDPCM decoded data values is outside an acceptable numerical range for such data.

22. Video data encoding apparatus operable to encode an array of inter-image encoded input video data values, the apparatus comprising:
a residual differential pulse code modulation (RDPCM) coder configured to apply a differential pulse code modulation operation to the array of input video data values to generate an array of RDPCM data values;
an entropy encoder operable to entropy-encode the RDPCM data; and
a data reordering unit configured to apply a data reordering operation to an array of data;
the apparatus being operable to associate a flag with the encoded data indicating whether the data reordering operation is applied to data which has been subject to RDPCM encoding or to data to be RDPCM encoded.

23. Video data encoding apparatus operable to encode an array of inter-image encoded input video data values, the apparatus comprising:
a residual differential pulse code modulation (RDPCM) coder configured to apply a differential pulse code modulation operation to the array of input video data values to generate an array of RDPCM data values;
an entropy encoder operable to entropy-encode the RDPCM data; and
a data reordering unit configured to apply a data reordering operation to an array of data;
the apparatus being operable to associate two or more flags with the encoded data, the two or more flags defining whether or not the data reordering operation should be applied in respect of two or more respective permutations of encoding parameters.

24. Apparatus according to any one of the preceding clauses, comprising a rate-distortion optimised quantisation processor operable, in respect of an array of data, according to the same processing order as that applied by the entropy encoder.

25. Video data decoding apparatus operable to decode an array of input encoded video data values, the apparatus comprising:
an entropy decoder; and
a residual differential pulse code modulation (RDPCM) decoder configured to apply a differential pulse code modulation operation to the entropy decoded video data values to generate an array of RDPCM data values;
in which the entropy decoder is operable to entropy-decode the input encoded video data in a processing order, with respect to the array of RDPCM data values, such that, for any RDPCM data value in the processing order, the RDPCM data value does not have a dependency on an RDPCM data value later in the processing order.

26. Apparatus according to clause 25, comprising a data reordering unit configured to apply a reordering operation to an array of data.

27. Apparatus according to clause 26, in which the data reordering operation is a rotation operation in which data values within a block are rotated by 180° about a centre of the block.

28. Apparatus according to clause 25 or clause 26, the apparatus being operable to detect two or more flags with the encoded data, the two or more flags defining whether or not the data reordering operation should be applied in respect of two or more respective permutations of encoding parameters.

29. Apparatus according to clause 28, in which the encoding parameters include some or all of:
whether an inter-image, intra-image or intra-block-copy mode is used;
whether an RDPCM operation is used; and
whether a transform skip or trans-quant bypass mode is used.

30. Apparatus according to clause 28, in which the encoding parameters include all of:
whether an inter-image, intra-image or intra-block-copy mode is used;
whether an RDPCM operation is used; and
whether a transform skip or trans-quant bypass mode is used.

31. Apparatus according to any one of clauses 26 to 30, the apparatus being operable to detect a flag with the encoded data indicating whether the data reordering operation is applied to data which has been subject to RDPCM decoding or to data to be RDPCM decoded.

32. Apparatus according to any one of clauses 25 to 31, in which:
the array of input encoded video data values comprises an array of inter-image encoded video data values; and
for any such array of input video data values, the processing order is always such that, for any RDPCM data value in the processing order, the RDPCM data value does not have a dependency on an RDPCM data value later in the processing order.

33. Apparatus according to any one of clauses 25 to 31, in which:
the array of input video data values comprises an array of intra-image encoded data values; and
for any such array of input video data values, the processing order is always such that, for any RDPCM data value in the processing order, the RDPCM data value does not have a dependency on an RDPCM data value later in the processing order.

34. Apparatus according to clause 32, in which the processing order is a horizontally scanned or a vertically scanned processing order.

35. Apparatus according to clause 31, in which the RDPCM decoder is operable to clip the RDPCM decoded data to an acceptable numerical range for such data.

36. Apparatus according to clause 31, in which the RDPCM decoder is operable to abort the decoding of the entropy decoded video data values if one or more of the RDPCM decoded data values exceeds an acceptable numerical range for such data.

37. Video data decoding apparatus operable to decode an array of input encoded video data values, the apparatus comprising:
an entropy decoder; and
a residual differential pulse code modulation (RDPCM) decoder configured to apply a differential pulse code modulation operation to the entropy decoded video data values to generate an array of RDPCM data values, the RDPCM decoder being operable to clip the RDPCM decoded data to an acceptable numerical range for such data.

38. Video data decoding apparatus operable to decode an array of input encoded video data values, the apparatus comprising:
an entropy decoder operable to entropy-decode the input encoded video data in a processing order, with respect to the array of input encoded video data values, the processing order being a horizontally scanned or a vertically scanned processing order; and
a residual differential pulse code modulation (RDPCM) decoder configured to apply a differential pulse code modulation operation to the entropy decoded video data values to generate an array of RDPCM data values.

39. Video data decoding apparatus operable to decode an array of input encoded video data values, the apparatus comprising:
an entropy decoder; and
a residual differential pulse code modulation (RDPCM) decoder configured to apply a differential pulse code modulation operation to the entropy decoded video data values to generate an array of RDPCM data values, the RDPCM decoder being operable to abort the decoding of the array of input encoded data values if one or more of the RDPCM decoded data values is outside an acceptable numerical range for such data.

40. Video data decoding apparatus operable to decode an array of input encoded video data values, the apparatus comprising:
an entropy decoder; and
a residual differential pulse code modulation (RDPCM) decoder configured to apply a differential pulse code modulation operation to the entropy decoded video data values to generate an array of RDPCM data values; and
a data reordering unit configured to apply a reordering operation to an array of data;
the apparatus being operable to detect a flag with the encoded data indicating whether the data reordering operation is applied to data which has been subject to RDPCM decoding or to data to be RDPCM decoded.

41. Video data decoding apparatus operable to decode an array of input encoded video data values, the apparatus comprising:
an entropy decoder; and
a residual differential pulse code modulation (RDPCM) decoder configured to apply a differential pulse code modulation operation to the entropy decoded video data values to generate an array of RDPCM data values; and
a data reordering unit configured to apply a reordering operation to an array of data;
the apparatus being operable to detect two or more flags with the encoded data, the two or more flags defining whether or not the data reordering operation should be applied in respect of two or more respective permutations of decoding parameters.

42. Video data capture, storage, transmission and/or recording apparatus comprising apparatus according to any one of the preceding clauses.

43. A video data encoding method for encoding an array of input video data values, the method comprising:
applying a residual differential pulse code modulation (RDPCM) operation to the array of input video data values to generate an array of RDPCM data values; and
entropy-encoding the RDPCM data in a processing order, with respect to the array of RDPCM data values, such that, for any RDPCM data value in the processing order, the RDPCM data value does not have a dependency on an RDPCM data value later in the processing order.

44. A video data encoding method for encoding an array of inter-image encoded input video data values, the method comprising:
applying a residual differential pulse code modulation (RDPCM) operation to the array of input video data values to generate an array of RDPCM data values; and
entropy-encoding the RDPCM data in a processing order, with respect to the array of RDPCM data values, the processing order being a horizontally scanned or a vertically scanned processing order.

45. A video data encoding method for encoding an array of input encoded video data values, the method comprising:
in a decoding path, applying a residual differential pulse code modulation (RDPCM) operation to the entropy decoded video data values to generate an array of RDPCM data values; and
clipping the RDPCM decoded data to an acceptable numerical range for such data.

46. A video data encoding method for encoding an array of inter-image encoded input video data values, the method comprising:

applying a residual differential pulse code modulation (RDPCM) operation to the array of input video data values to generate an array of RDPCM data values; and
entropy-encoding the RDPCM data; and
applying a reordering operation to reorder an array of data; and
associating a flag with the encoded data indicating whether the data reordering operation is applied to data which has been subject to RDPCM encoding or to data to be RDPCM encoded.

47. A video data encoding method for encoding an array of inter-image encoded input video data values, the method comprising:
applying a residual differential pulse code modulation (RDPCM) operation to the array of input video data values to generate an array of RDPCM data values; and
entropy-encoding the RDPCM data; and
applying a reordering operation to reorder an array of data; and
associating two or more flags with the encoded data, the two or more flags defining whether or not the data reordering operation should be applied in respect of two or more respective permutations of encoding parameters.

48. A video data decoding method for decoding an array of input encoded video data values, the method comprising:
entropy decoding the input encoded video data values in a processing order, with respect to the array of RDPCM data values, such that, for any RDPCM data value in the processing order, the RDPCM data value does not have a dependency on an RDPCM data value later in the processing order; and
applying a residual differential pulse code modulation (RDPCM) operation to the entropy decoded video data values to generate an array of RDPCM data values.

49. A video data decoding method for decoding an array of input encoded video data values, the method comprising:
entropy decoding the input encoded video data values;
applying a residual differential pulse code modulation (RDPCM) operation to the entropy decoded video data values to generate an array of RDPCM data values; and
clipping the RDPCM decoded data to an acceptable numerical range for such data.

50. A video data decoding method for decoding an array of input encoded video data values, the method comprising:
entropy-decoding the input encoded video data values data in a processing order, with respect to the array of data values, the processing order being a horizontally scanned or a vertically scanned processing order; and
applying a residual differential pulse code modulation (RDPCM) operation to the entropy decoded video data values to generate an array of RDPCM data values.

51. A video data decoding method for decoding an array of input encoded video data values, the method comprising:
entropy decoding the input encoded video data values;
applying a residual differential pulse code modulation (RDPCM) operation to the entropy decoded video data values to generate an array of RDPCM data values; and
aborting the decoding of the array of input encoded data values if one or more of the RDPCM decoded data values is outside an acceptable numerical range for such data.

52. A video data decoding method for decoding an array of input encoded video data values, the method comprising:
entropy decoding the input encoded video data values;
applying a residual differential pulse code modulation (RDPCM) operation to generate an array of RDPCM data values;
applying a data reordering operation to an array of data; and
detecting two or more flags with the encoded data, the two or more flags defining whether or not the data reordering operation should be applied in respect of two or more respective permutations of decoding parameters.

53. A video data decoding method for decoding an array of input encoded video data values, the method comprising:
entropy decoding the input encoded video data values;
applying a residual differential pulse code modulation (RDPCM) operation to generate an array of RDPCM data values;
applying a data reordering operation to an array of data; and
detecting a flag with the encoded data indicating whether the data reordering operation is applied to data which has been subject to RDPCM decoding or to data to be RDPCM decoded.

54. Computer software which, when executed by a computer, causes the computer to implement the method of any one of clauses 43 to 53.

55. A non-transitory machine-readable storage medium on which computer software according to clause 54 is stored.

56. Video data encoding apparatus operable to encode an array of input video data values, the apparatus comprising:
a differential pulse code modulation (DPCM) coder configured to apply a differential pulse code modulation operation to the array of input video data values to generate an array of DPCM data values;
a quantiser operable to quantise data derived from the DPCM data values; and
a controller for controlling selection of a rounding operation by the quantiser from two or more candidate rounding operations.

57. Apparatus according to clause 56, in which the controller is a rate-distortion-optimised quantisation controller.

58. Apparatus according to clause 56 or clause 57, comprising a data reordering unit configured to apply a reordering operation to an array of data input to or output from the DPCM coder.

59. Apparatus according to clause 58, in which the reordering operation is a rotation operation in which data values in the array of data are rotated in position about a point in the array.

60. Apparatus according to claim 56, in which the controller is operable in respect of data encoded using a subset of a group of possible encoding modes but not operable in respect of encoding modes in the group which are not in the subset.

61. Apparatus according to clause 60, in which the subset comprises intra-image encoding.

62. Apparatus according to clause 60 or 61, in which the group comprises intra-image encoding, inter-image encoding and intra-block-copy encoding.

63. Video data capture, storage, transmission and/or recording apparatus comprising apparatus according to any one of clauses 56 to 62.

64. A video data encoding method for encoding an array of input video data values, the method comprising:
applying a differential pulse code modulation (DPCM) operation to the array of input video data values to generate an array of DPCM data values;
quantising data derived from the DPCM data values; and
controlling selection of a rounding operation by the quantiser from two or more candidate rounding operations.

65. Computer software which, when executed by a computer, causes the computer to implement the method of clause 64.

66. A non-transitory machine-readable storage medium on which computer software according to clause 65 is stored.

Further respective features and/or embodiments of the present disclosure are defined by the following numbered clauses:

1. Video data encoding apparatus operable to encode an array of input video data values, the apparatus comprising:

a differential pulse code modulation (DPCM) coder configured to apply a differential pulse code modulation operation to the array of input video data values to generate an array of DPCM data values;

a quantiser operable to quantise data derived from the DPCM data values; and a controller for controlling selection of a rounding operation by the quantiser from two or more candidate rounding operations.

2. Apparatus according to clause 1, in which the controller is a rate-distortion-optimised quantisation controller.

3. Apparatus according to clause 2, comprising a data reordering unit configured to apply a reordering operation to an array of data input to or output from the DPCM coder.

4. Apparatus according to clause 3, in which the reordering operation is a rotation operation in which data values in the array of data are rotated in position about a point in the array.

5. Apparatus according to any one or the preceding clauses, in which the controller is operable in respect of data encoded using a subset of a group of possible encoding modes but not operable in respect of encoding modes in the group which are not in the subset.

6. Apparatus according to clause 5, in which the subset comprises intra-image encoding.

7. Apparatus according to clause 5 or clause 6, in which the group comprises intra-image encoding, inter-image encoding and intra-block-copy encoding.

8. Apparatus according to any one of the preceding clauses, comprising:

an entropy encoder operable to entropy-encode the DPCM data values in a processing order, with respect to the array of DPCM data values, such that, for any DPCM data value in the processing order, the DPCM data value does not have a dependency on a DPCM data value later in the processing order.

9. Apparatus according to clause 8, in which:

the array of input video data values comprises an array of residual values generated as differences between respective video samples of a current image and predicted versions of those video samples, the predicted versions being derived from one or more images other than the current image; and for any such array of input video data values, the processing order is always such that, for any DPCM data value in the processing order, the DPCM data value does not have a dependency on a DPCM data value later in the processing order.

10. Apparatus according to clause 8, in which:

the array of input video data values comprises an array of residual values generated as differences between respective video samples of a current image and predicted versions of those video samples, the predicted versions being derived from the current image; and for any such array of input video data values, the processing order is always such that, for any DPCM data value in the processing order, the DPCM data value does not have a dependency on a DPCM data value later in the processing order.

11. Apparatus according to clause 10, in which the predicted versions are derived from one or more reference pixels from reference regions adjacent to the image position of the respective video samples.

12. Apparatus according to clause 10, in which the predicted versions are derived from one or more reference pixels from reference regions defined with respect to the image position of the respective video samples by one or more motion vectors.

13. Apparatus according to any one of clauses 8 to 12, comprising a frequency transformer, the apparatus being operable in a first mode in which DPCM coding is used, and in a second mode in which the frequency transformer is operable to apply a frequency transformation instead of the DPCM coder applying a DPCM operation.

14. Apparatus according to clause 13, in which:

the frequency transformer is operable in the second mode to generate an array of frequency transformed data; and the entropy encoder is operable in the second mode to apply a processing order starting from an array position corresponding to that of a highest frequency component and ending at an array position corresponding to that of a lowest frequency component.

15. Apparatus according to clause 13 or clause 14, comprising a data reordering unit configured to apply a reordering operation to an array of data.

16. Apparatus according to clause 15, in which the data reordering operation is a rotation operation in which data values within a block are rotated by 180° about a centre of the block.

17. Apparatus according to clause 15 or clause 16, in which:

the first mode is a transform-skip mode in which a frequency transformation is not used; and the data reordering unit is configured so as always to operate on the DPCM coded data in the transform-skip mode.

18. Apparatus according to any one of clauses 15 to 17, the apparatus being operable to associate two or more flags with the encoded data, the two or more flags defining whether or not the data reordering operation should be applied in respect of two or more respective permutations of encoding parameters.

19. Apparatus according to clause 18, in which the encoding parameters include some or all of:

whether an inter-image, intra-image or intra-block-copy mode is used;

whether a DPCM operation is used; and whether a transform skip or trans-quant bypass mode is used.

20. Apparatus according to clause 19, in which the encoding parameters include all of:

whether an inter-image, intra-image or intra-block-copy mode is used;

whether a DPCM operation is used; and whether a transform skip or trans-quant bypass mode is used.

21. Apparatus according to any one of clauses 15 to 20, the apparatus being operable to associate a flag with the encoded data indicating whether the data reordering operation is applied to data which has been subject to DPCM encoding or to data to be DPCM encoded.

22. Apparatus according to any one of clauses 8 to 21, in which, for DPCM data, the processing order is a horizontally scanned or a vertically scanned processing order.

23. Apparatus according to any one of clauses 8 to 22, the apparatus comprising, in a decoding path, a residual differential pulse code modulation (RDPCM) decoder configured to apply a differential pulse code modulation operation to the entropy decoded video data values to generate an array of RDPCM data values.

24. Apparatus according to clause 23, in which the DPCM decoder is operable to clip the DPCM decoded data to an acceptable numerical range for such data.

25. Apparatus according to clause 23, in which the DPCM decoder is operable to abort the decoding of the entropy decoded video data values if one or more of the DPCM decoded data values exceeds an acceptable numerical range for such data.

26. Video data capture, storage, transmission and/or recording apparatus comprising apparatus according to any one of the preceding clauses.

27. A video data encoding method for encoding an array of input video data values, the method comprising:
 applying a differential pulse code modulation (DPCM) operation to the array of input video data values to generate an array of DPCM data values;
 quantising data derived from the DPCM data values; and
 controlling selection of a rounding operation by the quantiser from two or more candidate rounding operations.

28. Computer software which, when executed by a computer, causes the computer to implement the method of clause 27.

29. A non-transitory machine-readable storage medium on which computer software according to clause 28 is stored.

The invention claimed is:

1. A video data encoding apparatus configured to encode an array of input video data values, the apparatus comprising:
 a differential pulse code modulation (DPCM) coder implemented by circuitry and configured to apply a differential pulse code modulation operation to the array of input video data values to generate an array of DPCM data values;
 a quantizer implemented by the circuitry and configured to quantize data derived from the DPCM data values; and
 a controller implemented by the circuitry and configured to control selection of a rounding operation by the quantizer from two or more candidate rounding operations,
 the selected rounding operation being associated with a scan order of the array of DPCM data values, such that any DPCM data value in the scan order does not have a dependency on a DPCM data value provided later in the scan order.

2. The apparatus according to claim 1, wherein the controller circuitry is a rate-distortion-optimized quantization controller.

3. The apparatus according to claim 2, further comprising data reordering circuitry configured to apply a reordering operation to an array of data input to or output from the DPCM coder.

4. The apparatus according to claim 3, wherein the reordering operation is a rotation operation in which data values in the array of data are rotated in position about a point in the array.

5. The apparatus according to claim 1, further comprising:
 an entropy encoder implemented by the circuitry and configured to entropy-encode the DPCM data values in a processing order, with respect to the array of DPCM data values, such that, for any DPCM data value in the processing order, the DPCM data value does not have a dependency on a DPCM data value later in the processing order.

6. The apparatus according to claim 5, wherein:
 the array of input video data values comprises an array of residual values generated as differences between respective video samples of a current image and predicted versions of those video samples, the predicted versions being derived from one or more images other than the current image; and
 for any array of input video data values, the processing order is always such that, for any DPCM data value in the processing order, the DPCM data value does not have a dependency on a DPCM data value later in the processing order.

7. The apparatus according to claim 5, wherein:
 the array of input video data values comprises an array of residual values generated as differences between respective video samples of a current image and predicted versions of those video samples, the predicted versions being derived from the current image; and
 for any array of input video data values, the processing order is always such that, for any DPCM data value in the processing order, the DPCM data value does not have a dependency on a DPCM data value later in the processing order.

8. The apparatus according to claim 5, further comprising a frequency transformer implemented by the circuitry, wherein the apparatus is configured to use DPCM coding in a first mode, and use the frequency transformer in the second mode to apply a frequency transformation instead of DPCM coding.

9. The apparatus according to claim 8, wherein:
 in the second mode,
 the frequency transformer is configured to generate an array of frequency transformed data; and
 the entropy encoder is configured to apply a processing order starting from an array position corresponding to that of a highest frequency component and ending at an array position corresponding to that of a lowest frequency component.

10. The apparatus according to claim 9, further comprising data reordering circuitry configured to apply a reordering operation to an array of data.

11. The apparatus according to claim 10, wherein the data reordering operation is a rotation operation in which data values within a block are rotated by 180° about a center of the block.

12. The apparatus according to claim 10, wherein:
 the first mode is a transform-skip mode in which a frequency transformation is not used; and
 the data reordering circuitry is configured to always operate on the DPCM coded data in the transform-skip mode.

13. The apparatus according to claim 10, configured to associate two or more flags with the encoded data, the two or more flags defining whether or not the data reordering operation should be applied in respect of two or more respective permutations of encoding parameters.

14. The apparatus according to claim 10, configured to associate a flag with the encoded data indicating whether the data reordering operation is applied to data which has been subject to DPCM encoding or to data to be DPCM encoded.

15. The apparatus according to claim 5, further comprising, in a decoding path, a residual differential pulse code modulation (RDPCM) decoder configured to apply a differential pulse code modulation operation to the entropy decoded video data values to generate an array of RDPCM data values.

16. The apparatus according to claim 15, wherein the DPCM decoder is configured to clip the DPCM decoded data to an acceptable numerical range for the data.

17. The apparatus according to claim 15, wherein the DPCM decoder is configured to abort the decoding of the entropy decoded video data values if one or more of the DPCM decoded data values exceeds an acceptable numerical range for the data.

18. A video data capture, storage, transmission, and/or recording apparatus comprising the apparatus according to claim 1.

19. A video data encoding method for encoding an array of input video data values, the method comprising:

applying a differential pulse code modulation (DPCM) operation to the array of input video data values to generate an array of DPCM data values;

quantizing data derived from the DPCM data values; and controlling selection of a rounding operation by a quantizer from two or more candidate rounding operations, the selection being associated with a scan order of the array of DPCM data values, such that any DPCM data value in the scan order does not have a dependency on a DPCM data value provided later in the scan value.

20. A non-transitory computer readable medium including computer program instructions, which when executed by a computer causes the computer to perform a method for encoding an array of input video data values, the method comprising:

applying a differential pulse code modulation (DPCM) operation to the array of input video data values to generate an array of DPCM data values;

quantizing data derived from the DPCM data values; and controlling selection of a rounding operation by a quantizer from two or more candidate rounding operations, the selection being associated with a scan order of the array of DPCM data values, such that any DPCM data value in the scan order does not have a dependency on a DPCM data value provided later in the scan value.

\* \* \* \* \*